US012639457B2

(12) United States Patent
Hilliard et al.

(10) Patent No.: US 12,639,457 B2
(45) Date of Patent: May 26, 2026

(54) VISIBILITY FOR PARTICULARIZED DATA SECURITY

(71) Applicant: Appian Corporation, McLean, VA (US)

(72) Inventors: Matthew David Hilliard, Washington, DC (US); Kevin Gajewski, Chatham, NJ (US); Andrew Donald Brian Radcliffe, Arlington, VA (US); Max Henry Harper, Arlington, VA (US); Stephanie L. Colen, Alexandria, VA (US)

(73) Assignee: Appian Corporation, McLean, VA (US)

( * ) Notice: Subject to any disclaimer, the term of this patent is extended or adjusted under 35 U.S.C. 154(b) by 102 days.

(21) Appl. No.: 18/593,681

(22) Filed: Mar. 1, 2024

(65) Prior Publication Data

US 2024/0296244 A1 Sep. 5, 2024

Related U.S. Application Data

(60) Provisional application No. 63/488,427, filed on Mar. 3, 2023.

(51) Int. Cl.
*G06F 21/62* (2013.01)

(52) U.S. Cl.
CPC .......... *G06F 21/62* (2013.01); *G06F 21/6227* (2013.01)

(58) Field of Classification Search
CPC .. G06F 21/62; G06F 21/6227; G06F 21/6218; G06F 21/6245; G06F 2221/2141
See application file for complete search history.

(56) References Cited

U.S. PATENT DOCUMENTS

| | | | | |
|---|---|---|---|---|
| 9,275,094 | B2 * | 3/2016 | Lee | G06F 16/185 |
| 11,232,230 | B1 * | 1/2022 | Mudgil | G06F 21/6245 |
| 2007/0288614 | A1 * | 12/2007 | May | G06F 16/273 |
| | | | | 709/227 |
| 2009/0132419 | A1 * | 5/2009 | Grammer | G06F 21/6245 |
| | | | | 705/50 |
| 2011/0208739 | A1 * | 8/2011 | Weissman | G06F 16/245 |
| | | | | 707/E17.014 |
| 2011/0295839 | A1 * | 12/2011 | Collins | G06F 16/2428 |
| | | | | 707/719 |

(Continued)

*Primary Examiner* — Robert B Leung

(74) *Attorney, Agent, or Firm* — FINNEGAN, HENDERSON, FARABOW, GARRETT & DUNNER L.L.P.

(57) ABSTRACT

Methods, systems, apparatuses, and non-transitory computer-readable media are provided for particularized data security in a data storage environment. Operations may include identifying data security rules for a type of record, a record of the type including a plurality of data items; receiving a request by a first user to access a particular record of the type of record; determining, based on the data security rules and the request, that the first user is permitted to access the particular record; identifying visibility configurations, for the type of record, indicating different sets of data items, selected from the plurality of data items, for different types of users; determining, based on the visibility configurations and a user type of the first user, a first set of data items; and based on the request, causing a display, via a first user interface, of the first set of data items.

19 Claims, 15 Drawing Sheets

400

Identify, for type of record including data items, data security rules relating to data sources ⟶ 410

Receive request by first user to access particular record of type of record ⟶ 412

Determine, based on data security rules and request by first user, that first user is permitted to access particular record ⟶ 414

Identify visibility configurations, for type of record, indicating different sets of data items for different types of users ⟶ 416

Determine, based on visibility configurations and user type of first user, first set of data items ⟶ 418

Based on request by first user, cause display, via first user interface, of first set of data items ⟶ 420

(56) References Cited

U.S. PATENT DOCUMENTS

| | | | |
|---|---|---|---|
| 2012/0131064 A1* | 5/2012 | Browning | G06F 16/93 |
| | | | 707/E17.03 |
| 2016/0210470 A1* | 7/2016 | Rozenberg | G06F 21/6227 |
| 2021/0005302 A1* | 1/2021 | McFarlane | G06Q 30/06 |
| 2022/0335148 A1* | 10/2022 | Gandhi | G06F 3/0482 |

* cited by examiner

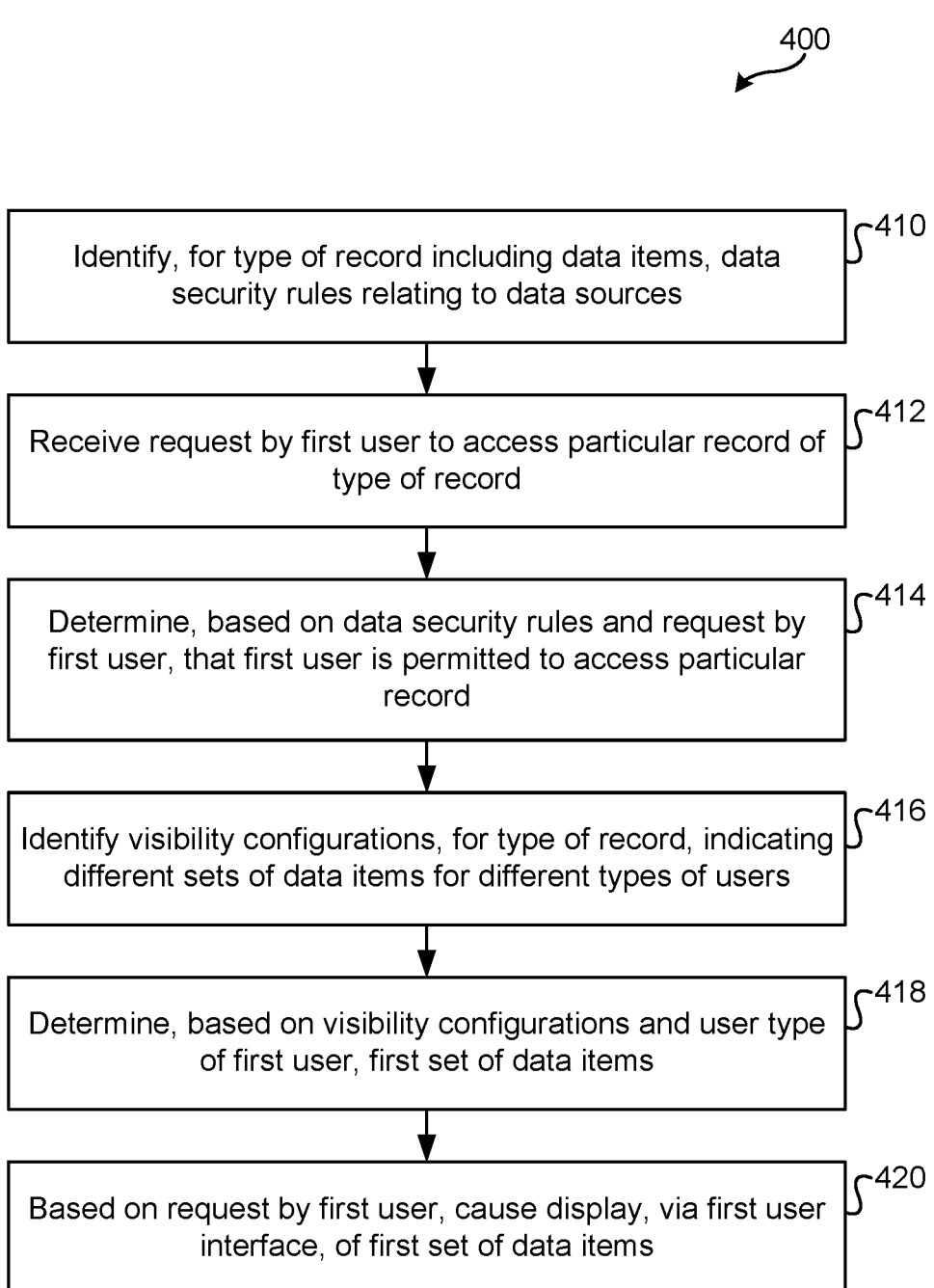

400

```
┌─────────────────────────────────────────────────────┐
│   Identify, for type of record including data items, data │ ⌐410
│        security rules relating to data sources           │
└─────────────────────────────────────────────────────┘
                           │
                           ▼
┌─────────────────────────────────────────────────────┐
│   Receive request by first user to access particular record of │ ⌐412
│                     type of record                        │
└─────────────────────────────────────────────────────┘
                           │
                           ▼
┌─────────────────────────────────────────────────────┐
│   Determine, based on data security rules and request by │ ⌐414
│  first user, that first user is permitted to access particular │
│                         record                           │
└─────────────────────────────────────────────────────┘
                           │
                           ▼
┌─────────────────────────────────────────────────────┐
│   Identify visibility configurations, for type of record, indicating │ ⌐416
│     different sets of data items for different types of users │
└─────────────────────────────────────────────────────┘
                           │
                           ▼
┌─────────────────────────────────────────────────────┐
│   Determine, based on visibility configurations and user type │ ⌐418
│            of first user, first set of data items          │
└─────────────────────────────────────────────────────┘
                           │
                           ▼
┌─────────────────────────────────────────────────────┐
│   Based on request by first user, cause display, via first user │ ⌐420
│              interface, of first set of data items         │
└─────────────────────────────────────────────────────┘
```

FIG. 4

Create New Security Rule

Who is part of this rule?

○ Users found in groups   710

○ Users found in fields   712

● Users who can view related records   714

Related records from

| customer | ▶ |

1110

Which Cases can they view?

Users can see Cases if they can see the related records from the selected relationship + Add Additional Conditions

1112

CANCEL   720

CREATE   722

1100

1300

CASE BURNDOWN

Administrator
554

| Open Cases | Critical Cases | Overdue Cases |
|---|---|---|
| 4 | 13 | 3 |

| STATUS \| Any ▼ | PRIORITY \| Any ▼ | SLA \| Overdue ▼ | ▼ | ⟳ |

| Case | Status | Priority | Service Level Agreement (SLA) |
|---|---|---|---|
| 7L77G6 | Closed | Medium | Overdue |
| Z0PXFL | Closed | Low | Overdue |
| 52TM6H | Closed | Medium | Overdue |

Cases per Engineer

Total Cases

VISIBILITY FOR PARTICULARIZED DATA SECURITY

CROSS-REFERENCE TO RELATED APPLICATIONS

This application claims the benefit of priority of U.S. Provisional Patent Application No. 63/488,427, filed on Mar. 3, 2023, which is incorporated herein by reference in its entirety.

TECHNICAL FIELD

The present disclosure generally relates to the field of data storage. More specifically, the present disclosure relates to particularized data security in a data storage environment.

BACKGROUND

Organizations may store their data as data records in various data sources. Users associated with the organizations may be granted access to a group or type of data records. When the group or type of data records include information that a user does not need or use to carry out the user's normal activities or other legitimate purposes, granting the user access to the entire group or type of data records may result in an unnecessarily extended scope of access, and contribute to risks of data security, such as the risk of the user's misuse of the information, or the risk of a data breach or data leak via the extended scope of access. As the number of data sources used to store data records increases, and malicious users find new ways to compromise or misuse data sources, the challenges to ensure data security will only further grow.

SUMMARY

In view of the foregoing, embodiments of the present disclosure may provide technical improvements to enhance data security by, for example, using an effective, efficient, and user-friendly system for particularized data security in a data storage environment.

Disclosed embodiments may include systems, methods, apparatuses, and non-transitory computer-readable media for particularized data security in a data storage environment. For example, disclosed embodiments may include a system for particularized data security in a data storage environment. The system may include at least one non-transitory storage medium configured to store program code, and at least one hardware processor configured to execute the program code to perform operations. The operations may include storing a plurality of records in one or more data sources. Each record of the plurality of records may include one or more data fields. The operations may include identifying a record-level data security rule. The record-level data security rule may indicate user permission to access a record of the plurality of records based on a data field of the record. The operations may also include applying the record-level data security rule to the one or more data sources; receiving a request by a user to access a particular record of the plurality of records; and based on the request and a data field of the particular record, in accordance with the record-level data security rule, determining whether the user is permitted to access the particular record. Consistent with disclosed embodiments, non-transitory computer-readable media may store instructions that, when executed by at least one processor, may cause the at least one processor to perform any of the processes described herein.

In accordance with some embodiments, the record-level data security rule may have a first level of abstraction. The operations may further include translating the record-level data security rule into one or more data security rules having a second level of abstraction lower than the first level. Determining whether the user is permitted to access the particular record may be based on the one or more data security rules.

In accordance with some embodiments, the first level of abstraction may include a natural language, and the second level of abstraction may include a computer language.

In accordance with some embodiments, the operations may further include causing a display of a user interface configured to allow user input of the record-level data security rule.

In accordance with some embodiments, the record-level data security rule may indicate that the user has permission to access the particular record if the user is identified in the data field of the particular record.

In accordance with some embodiments, the plurality of records may be of a first type, and the operations may further include associating the plurality of records with one or more records of a second type based on a common data field.

In accordance with some embodiments, the record-level data security rule may indicate that the user has permission to access the particular record if the user is permitted to access a second record, of the second type, associated with the particular record based on the common data field.

In accordance with some embodiments, the operations may further include configuring a record type; generating, for the record type and based on input data, the plurality of records; and configuring an object-level data security rule for the record type. The object-level data security rule may indicate that a user group has permission to access the plurality of records.

In accordance with some embodiments, the operations may further include activating the record-level data security rule to overlay or override the object-level data security rule for the plurality of records.

In accordance with some embodiments, the operations may further include, after activating the record-level data security rule, configuring a second record-level data security rule that grants the user group permission to access one or more of the plurality of records.

In accordance with some embodiments, the record-level data security rule may indicate security conditions. The security conditions may be based on one or more data fields in the plurality of records for comparison with specified values based on specified operators.

In accordance with some embodiments, the operations may further include denying access to the particular record of the plurality of records if the security conditions are not satisfied for the particular record.

In accordance with some embodiments, the operations may further include identifying, based on one or more record-level data security rules, a first set of records of the plurality of records. A first user may be permitted to access the first set of records. The operations may further include identifying, based on one or more record-level data security rules, a second set of records of the plurality of records. A second user may be permitted to access the second set of records. The second set may be different from the first set.

In accordance with some embodiments, the operations may further include generating, based on the first set of records, a first report of aggregated information. The first user may be permitted to access the first report. The operations may further include generating, based on the second set of records, a second report of aggregated information. The second user may be permitted to access the second report. The second report may be different from the first report.

Disclosed embodiments may include a non-transitory computer-readable medium including instructions that, when executed by at least one processor, cause the at least one processor to perform operations for particularized data security in a data storage environment. The operations may include storing a plurality of records in one or more data sources. Each record of the plurality of records may include one or more data fields. The operations may include identifying a record-level data security rule. The record-level data security rule may indicate user permission to access a record of the plurality of records based on a data field of the record. The operations may include applying the record-level data security rule to the one or more data sources; receiving a request by a user to access a particular record of the plurality of records; and based on the request and a data field of the particular record, in accordance with the record-level data security rule, determining whether the user is permitted to access the particular record.

In accordance with some embodiments, the record-level data security rule may indicate that the user has permission to access the particular record if the user is identified in the data field of the particular record.

In accordance with some embodiments, the operations may further include causing a display of a user interface configured to allow user input of the record-level data security rule.

Disclosed embodiments may include a method for particularized data security in a data storage environment. The method may include storing a plurality of records in one or more data sources. Each record of the plurality of records may include one or more data fields. The method may include identifying a record-level data security rule. The record-level data security rule may indicate user permission to access a record of the plurality of records based on a data field of the record. The method may include applying the record-level data security rule to the one or more data sources; receiving a request by a user to access a particular record of the plurality of records; and based on the request and a data field of the particular record, in accordance with the record-level data security rule, determining whether the user is permitted to access the particular record.

In accordance with some embodiments, the record-level data security rule may indicate that the user has permission to access the particular record if the user is identified in the data field of the particular record.

In accordance with some embodiments, the method may further include causing a display of a user interface configured to allow user input of the record-level data security rule.

Disclosed embodiments may include a system for particularized data security in a data storage environment. The system may include at least one non-transitory storage medium configured to store program code, and at least one hardware processor configured to execute the program code to perform operations. The operations may include identifying one or more data security rules for a type of record. The one or more data security rules may relate to one or more data sources. A record of the type may include a plurality of data items. The operations may include receiving a request by a first user to access a particular record of the type of record. The operations may include determining, based on the one or more data security rules and the request by the first user, that the first user is permitted to access the particular record. The operations may include identifying visibility configurations for the type of record. The visibility configurations may indicate different sets of one or more data items, selected from the plurality of data items, for different types of users. The operations may include determining, based on the visibility configurations and a user type of the first user, a first set of one or more data items of the plurality of data items; and based on the request by the first user, causing a display, via a first user interface, of the first set of one or more data items. Consistent with disclosed embodiments, non-transitory computer-readable media may store instructions that, when executed by at least one processor, may cause the at least one processor to perform any of the processes described herein.

In accordance with some embodiments, the operations may further include receiving a request by a second user to access the particular record; determining, based on the one or more data security rules and the request by the second user, that the second user is permitted to access the particular record; and determining, based on the visibility configurations and a user type of the second user, a second set of one or more data items of the plurality of data items. The second set may be different from the first set. The operations may further include, based on the request by the second user, causing a display, via a second user interface, of the second set of one or more data items.

In accordance with some embodiments, the plurality of data items may include an information item or an actionable item.

In accordance with some embodiments, the actionable item may be configured to trigger one or more processes executable by the at least one hardware processor.

In accordance with some embodiments, the plurality of data items may include a plurality of tabs in a user interface.

In accordance with some embodiments, the first user interface may include a web browser.

In accordance with some embodiments, the operations may further include identifying, in the visibility configurations, one or more rules for the user type of the first user. The one or more rules may indicate a default set of data items, of the plurality of data items, to be displayed for the user type of the first user.

In accordance with some embodiments, the operations may further include updating the one or more rules for the user type of the first user by changing the default set of data items to be displayed for the user type of the first user.

In accordance with some embodiments, the operations may further include generating a plurality of records based on input data, and permitting or denying access to the plurality of records, based on the one or more data security rules.

In accordance with some embodiments, the operations may further include identifying, based on the one or more data security rules, a first set of records of the plurality of records. The first user may be permitted to access the first set of records. The operations may further include identifying, based on the one or more data security rules, a second set of records of the plurality of records. A second user may be permitted to access the second set of records. The second set of records may be different from the first set of records.

In accordance with some embodiments, the operations may further include generating, based on the first set of records, a first report of aggregated information. The first user may be permitted to access the first report. The operations may further include generating, based on the second set of records, a second report of aggregated information. The second user may be permitted to access the second report. The second report may be different from the first report.

In accordance with some embodiments, the operations may further include receiving, from a second user, an indication to share security permissions associated with the second user for the particular record with the first user; and based on the indication, causing a display, via the first user interface, of a second set of one or more data items of the plurality of data items. The second set may be different from the first set.

Disclosed embodiments may include a non-transitory computer-readable medium including instructions that, when executed by at least one processor, cause the at least one processor to perform operations for particularized data security in a data storage environment. The operations may include identifying one or more data security rules for a type of record. The one or more data security rules may relate to one or more data sources. A record of the type may include a plurality of data items. The operations may include receiving a request by a first user to access a particular record of the type of record; determining, based on the one or more data security rules and the request by the first user, that the first user is permitted to access the particular record; and identifying visibility configurations for the type of record. The visibility configurations may indicate different sets of one or more data items, selected from the plurality of data items, for different types of users. The operations may include determining, based on the visibility configurations and a user type of the first user, a first set of one or more data items of the plurality of data items; and based on the request by the first user, causing a display, via a first user interface, of the first set of one or more data items.

In accordance with some embodiments, the operations may further include receiving a request by a second user to access the particular record; determining, based on the one or more data security rules and the request by the second user, that the second user is permitted to access the particular record; and determining, based on the visibility configurations and a user type of the second user, a second set of one or more data items of the plurality of data items. The second set may be different from the first set. The operations may further include, based on the request by the second user, causing a display, via a second user interface, of the second set of one or more data items.

In accordance with some embodiments, the plurality of data items may include an information item or an actionable item.

In accordance with some embodiments, the actionable item may be configured to trigger one or more processes executable by the at least one hardware processor.

Disclosed embodiments may include a method for particularized data security in a data storage environment. The method may include identifying, by a computing device, one or more data security rules for a type of record. The one or more data security rules may relate to one or more data sources. A record of the type may include a plurality of data items. The method may include receiving a request by a first user to access a particular record of the type of record; determining, based on the one or more data security rules and the request by the first user, that the first user is permitted to access the particular record; and identifying visibility configurations for the type of record. The visibility configurations may indicate different sets of one or more data items, selected from the plurality of data items, for different types of users. The method may include determining, based on the visibility configurations and a user type of the first user, a first set of one or more data items of the plurality of data items; and based on the request by the first user, causing a display, via a first user interface, of the first set of one or more data items.

In accordance with some embodiments, the method may further include receiving a request by a second user to access the particular record; determining, based on the one or more data security rules and the request by the second user, that the second user is permitted to access the particular record; and determining, based on the visibility configurations and a user type of the second user, a second set of one or more data items of the plurality of data items. The second set may be different from the first set. The method may further include, based on the request by the second user, causing a display, via a second user interface, of the second set of one or more data items.

In accordance with some embodiments, the plurality of data items may include an information item or an actionable item.

In accordance with some embodiments, the actionable item may be configured to trigger one or more processes executable by the at least one hardware processor.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4 shows an example method for visibility for particularized data security, consistent with some embodiments of the present disclosure.

DETAILED DESCRIPTION

Figure 1:
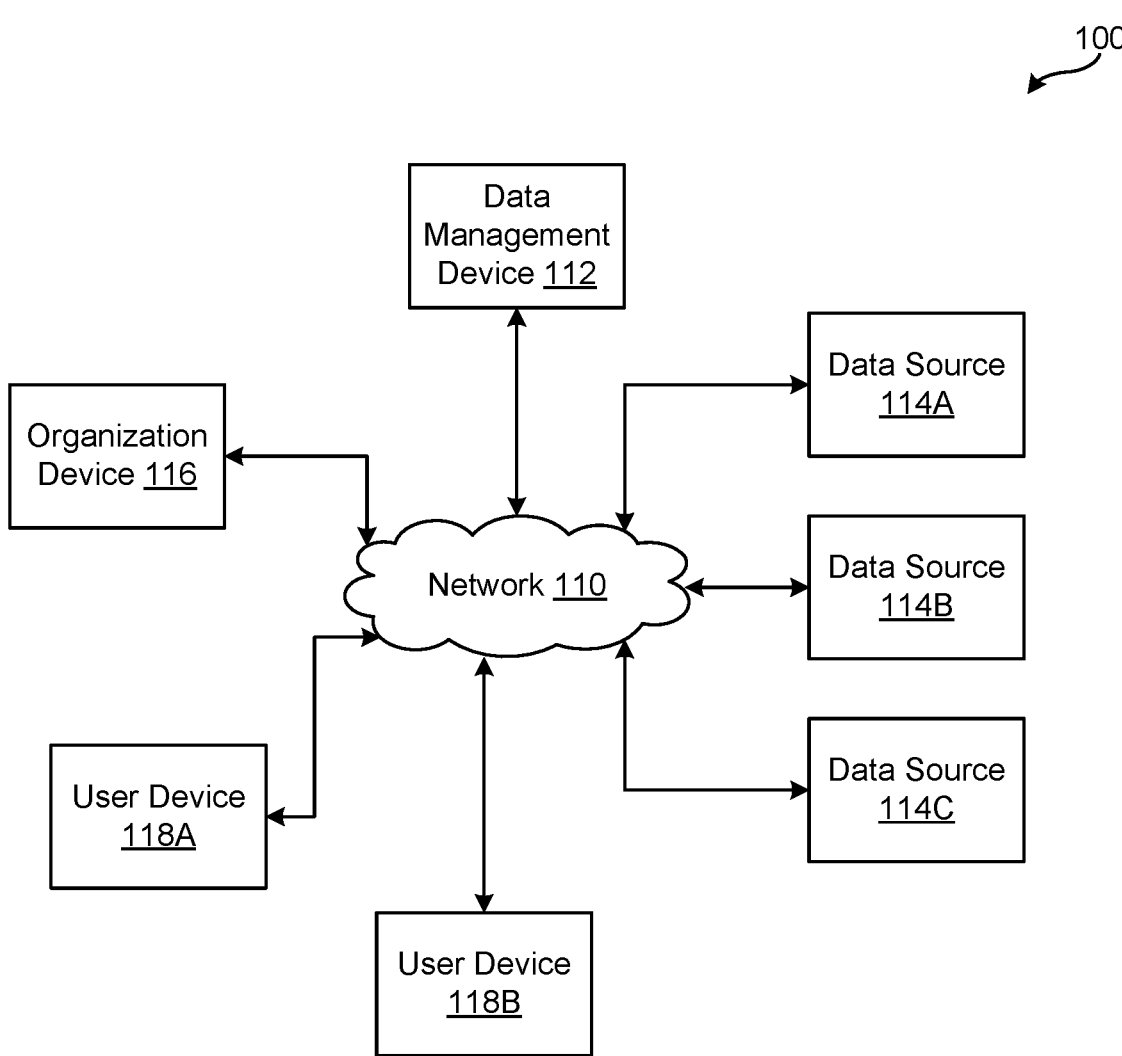
FIG. 1 shows an example system for particularized data security in a data storage environment, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

FIG. 1 shows an example system 100 for particularized data security in a data storage environment, consistent with some embodiments of the present disclosure. The system 100 may include one or more networks (e.g., network 110), one or more data management devices (e.g., data management device 112), one or more data sources (e.g., data sources 114A, 114B, 114C, etc.), one or more organization devices (e.g., organization device 116), and/or one or more user devices (e.g., user devices 118A, 118B, etc.). The system 100 may include additional or alternative devices or components, consistent with embodiments of the present disclosure.

The network 110 may connect the data management device 112, the data sources 114A, 114B, 114C, the organization device 116, and/or the user devices 118A, 118B (e.g., using interconnected communication links). The network 110 may include one or more of any of various types of networks for communication of information, such as a cellular network (e.g., 2G, 3G, 4G, or 5G), a satellite network, a Wi-Fi network, a WiMAX network, a Bluetooth network, a near-field communication (NFC) network, a low-power wide-area networking (LPWAN) network, a mobile network, a terrestrial microwave network, a wireless ad hoc network, an Ethernet network, a telephone network, a power-line communication (PLC) network, a coaxial cable network, an optical fiber network, and/or the like. The network 110 may include a wired network or a wireless network. The network 110 may include a personal area network, a local area network, a metropolitan area network, a wide area network, a global area network, a space network, or any other type of computer network that may use data connections between network nodes. In some examples, the network 110 may include an Internet Protocol (IP) based network.

The data sources 114A, 114B, 114C may include any type of computing device configured to store data. The data sources 114A, 114B, 114C may be configured to store data records. In some examples, the data sources 114A, 114B, 114C may include, for example, databases or other suitable data structures for storing data. For example, the data sources 114A, 114B, 114C may include object databases, relational databases, graph databases, hierarchical databases, cloud databases, NoSQL databases, document databases, distributed databases, network databases, and/or any other suitable type of database. Additionally or alternatively, the data sources 114A, 114B, 114C may use or be based on suitable types of data structures, such as trees, arrays, queues, linked lists, stacks, graphs, hash tables, and/or other types of data structures. Data stored in the data sources 114A, 114B, 114C may include duplicate copies or non-duplicate copies. For example, each of one or more of the data sources 114A, 114B, 114C may store a duplicate copy of a data record. Additionally or alternatively, for a particular data record, a single copy of the data record may be stored in one of the data sources 114A, 114B, 114C.

The data management device 112 may include any type of computing device configured to manage, administer, configure, control, or organize the data sources 114A, 114B, 114C, and/or the data stored in the data sources 114A, 114B, 114C. For example, the data management device 112 may implement or provide a data management system configured to manage the data sources 114A, 114B, 114C. The data management device 112 may be configured to serve as an interface between the data sources 114A, 114B, 114C and entities or persons using the data sources 114A, 114B, 114C. For example, the data management device 112 may be configured to provide a user interface that may allow a user to browse, view, select, retrieve, download, upload, or take any other desired action on, data records in the data sources 114A, 114B, 114C. As another example, the data management device 112 may be configured to provide a user interface that may allow an administrator to add, configure, update, or modify, rules or configurations for managing the data in the data sources 114A, 114B, 114C. The data management device 112 may be configured to implement a system for particularized data security, including data security rules and/or visibility configurations, as described in greater detail below.

The user devices 118A, 118B may include any type of computing device configured to provide a user with desired functionalities to access data stored in the data sources 114A, 114B, 114C. The organization device 116 may include any type of computing device configured to provide a person associated with an organization (e.g., an administrator) with desired functionalities to configure data security rules and/or manage other configurations for particularized data security associated with the organization.

The data sources 114A, 114B, 114C, the data management device 112, the user devices 118A, 118B, and/or the organization device 116 may include, for example, an embedded system, a computer, a laptop computer, a desktop computer, a mainframe computer, a tablet, a smart phone, a mobile phone, a mobile device, a server device, a client device, an automotive electronics device, an extended reality headset, a smart watch, an Internet of things (IoT) device, or any other type of computing device.

In some examples, one or more functionalities as described herein may be implemented using a larger or smaller number of computing devices. For example, the functionalities executed by one or more of the data sources 114A, 114B, 114C, the data management device 112, the user devices 118A, 118B, and/or the organization device 116 may be implemented by a single computing device, or by multiple computing devices, as desired.

Figure 2:
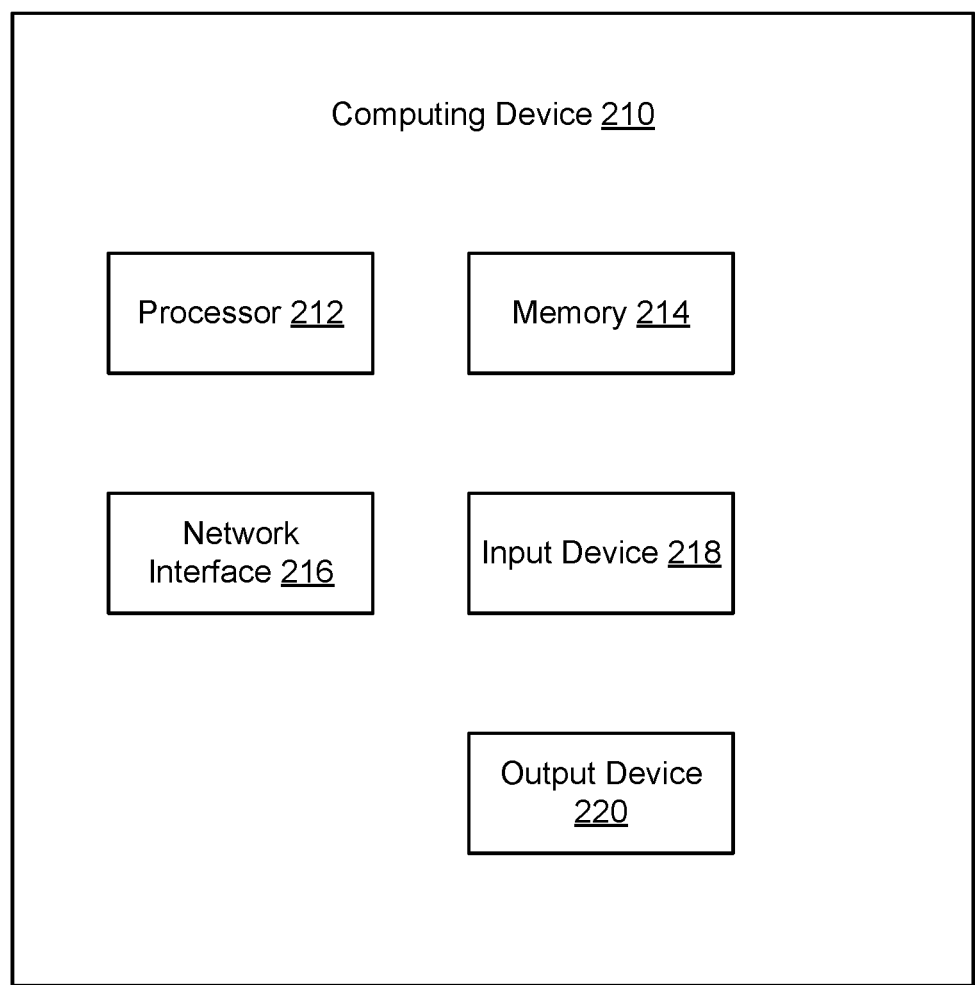
FIG. 2 shows an example computing device, consistent with some embodiments of the present disclosure.

FIG. 2 shows an example computing device 210, consistent with some embodiments of the present disclosure. The computing device 210 may include, for example, at least one processor 212, at least one memory 214, at least one network interface 216, at least one input device 218, and/or at least one output device 220. The devices as described herein (e.g., the data sources 114A, 114B, 114C, the data management device 112, the user devices 118A, 118B, and/or the organization device 116 shown in FIG. 1) may similarly include these components and/or may be implemented in a similar manner as the computing device 210. In some examples, the computing device 210 including one or more of the components may be implemented using virtualization technologies and/or cloud computing technologies.

The processor 212 may execute instructions of a computer program to perform any of the functions described herein. The processor 212 may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor 212 may include a single-core or multiple-core processor (e.g., dual-core, quad-core, or with any desired number of cores). The processor 212 may provide the ability to execute, control, run, or store multiple processes, applications, or programs. In some examples, the processor 212 may be configured to provide parallel processing functionalities to allow a device associated with the processor to execute multiple processes simultaneously. In some examples, the processor 212 may be configured with virtualization technologies. Other types of processor arrangements may be implemented to provide the capabilities described herein.

The memory 214 may include a non-transitory computer-readable medium that may store instructions that, when executed by at least one processor, cause the at least one processor to perform one or more processes as described herein. A non-transitory computer-readable medium may include any type of physical memory on which information or data readable by at least one processor may be stored. A non-transitory computer-readable medium may include, for example, random access memory (RAM), read-only memory (ROM), compact disc read-only memory (CD-ROM), digital versatile discs (DVDs), programmable read-only memory (PROM), erasable programmable read-only memory (EPROM), non-volatile random-access memory (NVRAM), volatile memory, non-volatile memory, hard drives, flash drives, disks, caches, registers, an optical data storage medium, a physical medium with patterns, or networked versions thereof. A non-transitory computer-readable medium may include multiple structures and may be located at a local location or at a remote location.

The network interface 216 may include, for example, a network card, a modem, and/or the like, and may be configured to provide data communication (e.g., two-way data communication) with a network. The network interface 216 may be a wireless interface, a wired interface, or a combination of the two. The specific design and implementation of the network interface 216 may depend on the communication network via which the computing device 210 is intended to operate. For example, the network interface 216 may include a Wireless Local Area Network (WLAN) card, an Integrated Services Digital Network (ISDN) card, a cellular modem, a satellite modem, a modem configured to provide data communication connections via the Internet, a network card with an Ethernet port, a device with radio frequency receivers and transmitters, a device with optical receivers and transmitters, and/or the like. The network interface 216 may be designed to operate via any type of desired network. The network interface 216 may be configured to send and receive electrical, electromagnetic, or optical signals that may represent various types of data.

The input device 218 may include, for example, a keyboard, a mouse, a touch pad, a touch screen, one or more buttons, a joystick, a microphone, and/or any other device configured to detect and/or receive input. In some examples, the input device 218 may include one or more of various types of sensors, such as an image sensor, a temperature sensor, a humidity sensor, a location sensor, or any other type of sensor. The output device 220 may include, for example, a light indicator, a light source, a display (e.g., a light-emitting diode (LED) display, an organic light-emitting diode (OLED) display, a liquid-crystal display (LCD), or a dot-matrix display), a screen, a touch screen, a speaker, a headphone, a device configured to provide tactile cues, and/or any other device configured to provide output.

The memory 214 may store instructions that, when executed by at least one processor, cause the at least one processor to perform one or more processes as described herein. The instructions may include, for example, software instructions, computer programs, computer code, executable instructions, source code, machine instructions, machine language programs, or any other type of directions for a computing device. The instructions may be based on one or more of various types of desired programming languages, and may include (e.g., embody) various processes for particularized data security as described herein.

Figure 3:
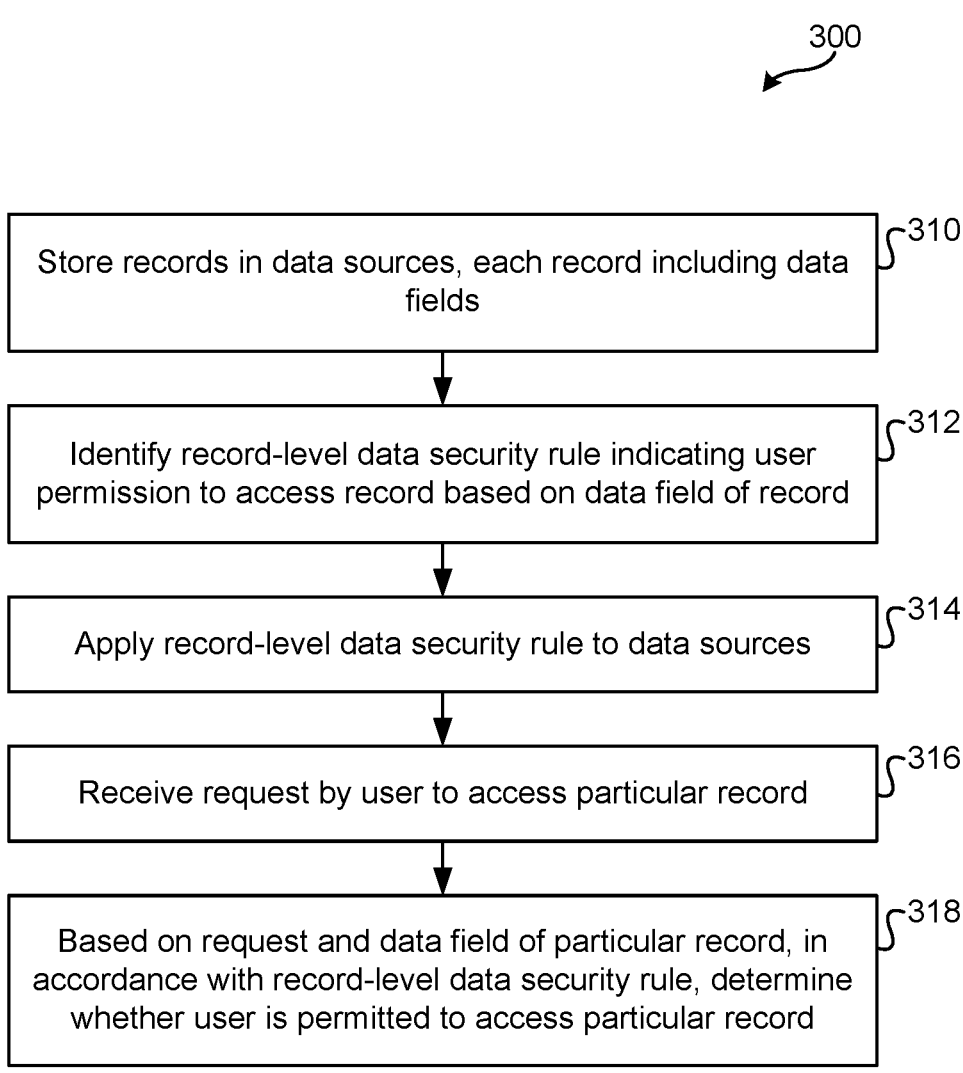
FIG. 3 shows an example method for rule-based particularized data security, consistent with some embodiments of the present disclosure.

Disclosed embodiments, including methods, systems, apparatuses, and non-transitory computer-readable media, may relate to particularized data security in a data storage environment. FIG. 3 shows an example method 300 for rule-based particularized data security, consistent with some embodiments of the present disclosure. With reference to FIG. 3, and as further discussed in detail below, in step 310, one or more computing devices may store a plurality of records in one or more data sources. Each record of the plurality of records may include one or more data fields. In step 312, the one or more computing devices may identify a record-level data security rule. The record-level data security rule may indicate user permission to access a record of the plurality of records based on a data field of the record. In step 314, the one or more computing devices may apply the record-level data security rule to the one or more data sources. In step 316, the one or more computing devices may receive a request by a user to access a particular record of the plurality of records. In step 318, the one or more computing devices may, based on the request and a data field of the particular record, in accordance with the record-level data security rule, determine whether the user is permitted to access the particular record.

Disclosed embodiments may include a system for particularized data security in a data storage environment. The system may include at least one non-transitory storage medium configured to store program code, and at least one hardware processor configured to execute the program code to perform operations as described herein. A data storage environment may refer to, for example, any type of environment or system configured to store data or information and/or associated with storing data or information. For example, a data storage environment may include one or more computing devices associated with storing data (e.g., one or more of the data sources 114A, 114B, 114C, the data management device 112, the user devices 118A, 118B, and/or the organization device 116). Particularized data security may refer to, for example, securing data with specific or particular configurations related to security. Particularized data security may include, for example, data security as specific as at a data record level or at a data field level, or being specific to particular users, user groups, and/or organizations. Particularized data security may include, for example, data security based on record-level data security rules (e.g., including enforcing data security rules), and/or visibility configurations of data records for different users (e.g., including generating views of data), as described in greater detail below. A non-transitory storage medium may include, for example, a non-transitory computer-readable medium. Program code may include, for example, instructions, software instructions, computer programs, computer code, executable instructions, source code, machine instructions, machine language programs, or any other type of directions for a computing device. The program code may be based on one or more of various types of desired programming languages, and may include (e.g., embody) various processes for particularized data security as described herein. A hardware processor (e.g., the processor 212) may be configured to execute instructions of a computer program to perform the functions described herein.

Disclosed embodiments may include storing a plurality of records in one or more data sources, in accordance with step 310. Each record of the plurality of records may include one or more data fields. A record may refer to, for example, any type of collection, grouping, structure, or organization of data or information. In some examples, a record may include, for example, a row in a database or spreadsheet. A data field may refer to, for example, a member, element, portion, section, or part of a record of data. The plurality of records may be stored in one or more data sources (e.g., the data sources 114A, 114B, 114C).

In some examples, one or more computing devices may be configured to store the plurality of records in the one or more data sources. For example, a computing device (e.g., the data management device 112) may facilitate the plurality of records to be stored in the one or more data sources. In some examples, the data management device 112 may facilitate different organizations (e.g., companies, firms, governments, universities, or other types of entities) to store their respective data in the one or more data sources. The data management device 112 may implement or provide a system that may allow an administrator associated with an organization to set or update the configurations for storing the data of the organization in the one or more data sources. For example, an administrator associated with an organization may use a computing device (e.g., the organization device 116) to set or update the configurations for storing the data of the organization in the one or more data sources. In some examples, an individual (e.g., an administrator associated with an organization) may define, specify, or configure a record type for the record. Additionally or alternatively, a data type may be configured for each data field of a record, such as a numerical data type, a textual data type, a binary data type, and/or any other data type.

Disclosed embodiments may include identifying a record-level data security rule, in accordance with step 312. The record-level data security rule may indicate user permission to access a record of the plurality of records based on a data field of the record. The record-level data security rule may refer to, for example, any type of command, rule, direction, or instruction associated with data security on a record level. For example, the record-level data security rule may indicate whether a particular record is accessible by a user, and/or conditions for granting access to a particular record. The record-level data security rule may indicate whether a user is permitted to access a record based on a data field of the record. For example, the data field of the record may indicate a user associated with the record (e.g., a user assigned to the record), and the indicated user may be permitted to access the record. As another example, the data field of the record may be related to or linked to a data field of another record, and the access permissions to the record may be the same as or based on the access permissions to the other record.

Disclosed embodiments may include applying the record-level data security rule to the one or more data sources, in accordance with step 314. Applying the record-level data security rule to the one or more data sources may include, for example, translating the record-level data security rule into computer-readable instructions, and implementing the computer-readable instructions for the one or more data sources. For example, the data management device 112 may be configured to cause execution of the computer-readable instructions, so that the record-level data security rule may be applied to any received requests to access data stored in the one or more data sources.

Disclosed embodiments may include receiving a request by a user to access a particular record of the plurality of records, in accordance with step 316. For example, via the user device 118A, a user may send, to the data management device 112 and/or the one or more data sources 114A, 114B, 114C, a request to access a particular record of the plurality of records. In some examples, the request may include an identifier of the particular record that the user may request access to, identification information of the user, authentication information of the user, a timestamp associated with transmitting the request, and/or any other desired information. In some examples, the data management device 112 may cause a display of a user interface via the user device 118A, and the user interface may allow the user to enter the request to access the particular record. For example, to generate a request to access the particular record, the user may, via the user interface, enter an identifier of the particular record, select an identifier of the particular record from a listing of record identifiers, or perform any other suitable action. The data management device 112 and/or the one or more data sources 114A, 114B, 114C may receive the request by the user to access the particular record of the plurality of records.

Disclosed embodiments may include, based on the request and a data field of the particular record, in accordance with the record-level data security rule, determining whether the user is permitted to access the particular record, in accordance with step 318. For example, the request may indicate the identity of the user, and the identity of the user may be used by the data management device 112 and/or the one or more data sources 114A, 114B, 114C to determine whether the user is permitted to access the particular record. The record-level data security rule may identify the data field of the particular record to be used to determine the user access permission, and may indicate how the data field of the particular record may be used to determine the user access permission. In some embodiments, the record-level data security rule may indicate that the user has permission to access the particular record if the user is identified in the data field of the particular record. For example, the record-level data security rule may indicate that a user identified in the data field of the particular record may have permission to access the particular record. If the user requesting access to the particular record is identified in (or associated with) the data field of the particular record, it may be determined that the user is permitted to access the particular record. If the user requesting access to the particular record is not identified in (or associated with) the data field of the particular record, it may be determined that the user is not permitted to access the particular record.

In some embodiments, the plurality of records may be of a first type. Disclosed embodiments may include associating the plurality of records with one or more records of a second type based on a common data field. In some embodiments, the record-level data security rule may indicate that the user has permission to access the particular record if the user is permitted to access a second record, of the second type, associated with the particular record based on the common data field. For example, the data field of the particular record may be associated with or linked to a data field of another record (e.g., of a record type different from the record type of the particular record). The data field of the particular record and its linked data field of the other record may be a common data field (e.g., the data fields of the two records may have the same data type, may have the same data field type or name, and/or may have the same value). The first type of records and the second type of records may include different record types (e.g., a "case" record type, a "customer" record type, or other record types). The record-level data security rule may indicate that a user having permission to access the associated or linked other record may have permission to access the particular record. If the user requesting access to the particular record is permitted to access the other record associated with or linked to the data field of the particular record, it may be determined that the user is permitted to access the particular record. If the user requesting access to the particular record is not permitted to access the other record associated with or linked to the data field of the particular record, it may be determined that the user is not permitted to access the particular record.

In some examples, two record types may be linked by specified data fields (e.g., common data fields). For example, it may be configured that the "case" record type may be linked to the "customer" record type. The corresponding or linking data fields from the two record types may be specified (e.g., by a person using the system). For example, it may be specified that a "related customer" data field in the "case" type of record may correspond or link to a "customer name" data field in the "customer" type of record. A record of the "case" record type may be linked to a record of the "customer" record type, based on a determination that the "related customer" data field in the record of the "case" record type has the same or corresponding value as the "customer name" data field in the record of the "customer" record type. In some examples, it may be configured whether the linking between the two record types may include a one-to-many relationship (e.g., one record of the "case" type may be linked to several records of the "customer" type), a many-to-one relationship (e.g., several records of the "case" type may be linked to one record of the "customer" type), a one-to-one relationship (e.g., one record of the "case" type may be linked to one record of the "customer" type), or any other desired relationship.

Figure 5:
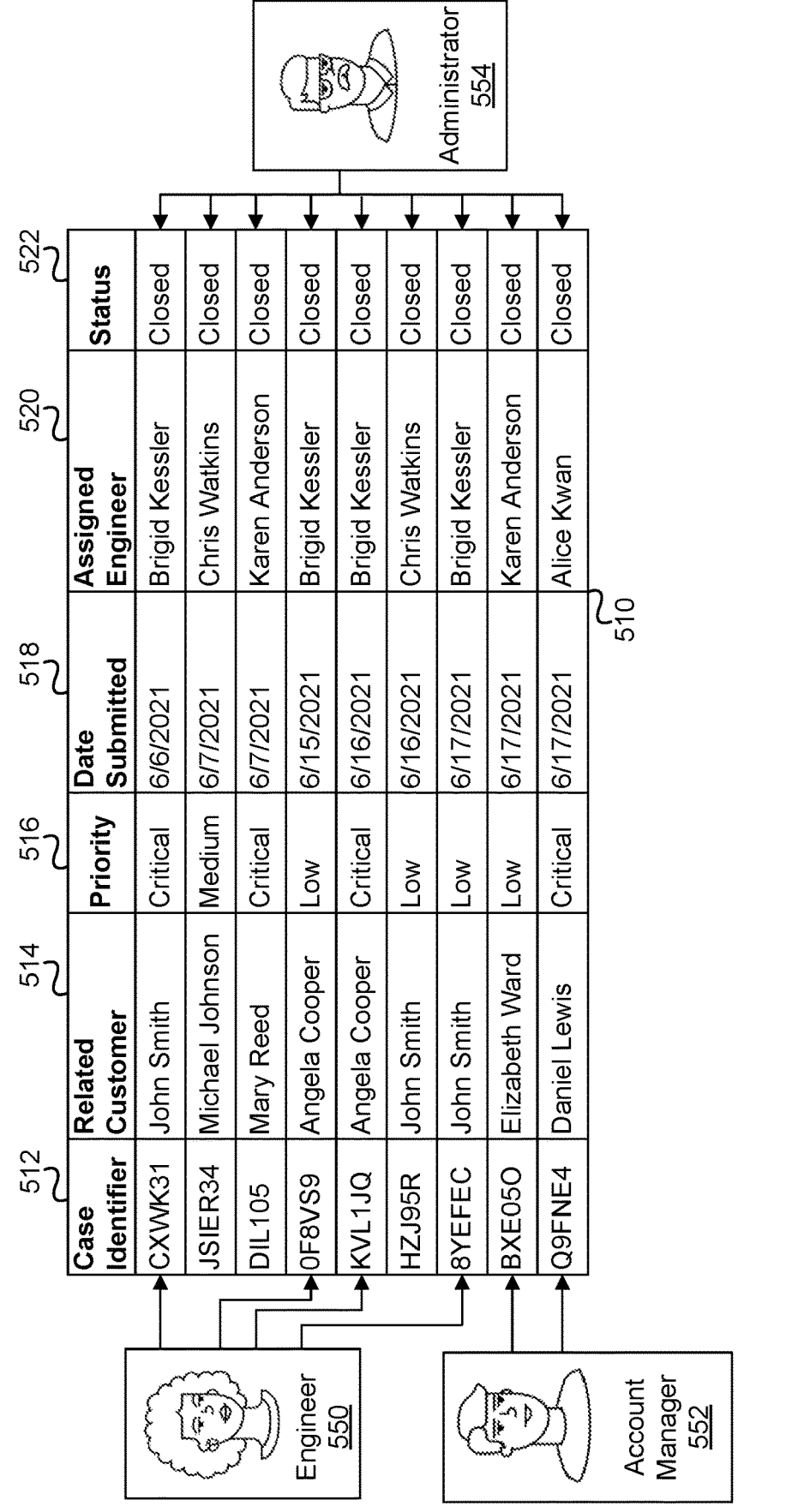
FIG. 5 shows an example diagram of user access to records, consistent with some embodiments of the present disclosure.

FIG. 5 shows an example diagram 500 of user access to records, consistent with some embodiments of the present disclosure. With reference to FIG. 5, a chart 510 may show a list of records that may be stored in the one or more data sources 114A, 114B, 114C. The list of records may be associated with an organization (e.g., a company). Each row in the chart 510 may include a record. The list of records may have a record type, such as a record type of case (e.g., each record may be for a case that the organization may handle). A record in the list of records may be configured with and may include a plurality of data fields, such as case identifier 512, related customer 514, priority 516, date submitted 518, assigned engineer 520, and status 522. The data fields of each record in the list of records may be populated with corresponding data.

Based on record-level data security rules, particularized data security may be applied to the list of records. For example, a record-level data security rule may indicate that a user as identified in the assigned engineer data field 520 of a record may have permission to access the record. Accordingly, the engineer Brigid Kessler 550 may be permitted to access the records whose assigned engineer data field 520 identifies the engineer Brigid Kessler 550 (e.g., the records with identifiers "CXWK31," "0F8VS9," "KVL1JQ," and "8YEFEC").

As another example, a record-level data security rule may indicate that a user may have permission to access a record if the user has permission to access a second record associated with or linked to the record based on the related customer data field 514. For example, records of a second record type of customer may be created for the organization, and the customer type of record may include a data field of customer name. The customer name data field in the customer type of record may be associated with or linked to the related customer data field 514 of a record of the case type. Records of the two types may be associated with each other if the corresponding data fields have the same value. Accordingly, the account manager 552 may have permission to access the record with the identifier "BXE050" when the account manager 552 has permission to access a linked record of the customer type indicating a customer name of Elizabeth Ward, and may have permission to access the record with the identifier "Q9FNE4" when the account manager 552 has permission to access a linked record of the customer type indicating a customer name of Daniel Lewis.

Additionally or alternatively, an administrator 554 may be granted permission to access all of the records listed in the chart 510. For example, a record-level data security rule may be configured to grant a user or a group of users permission to access all of the records of a particular record type (e.g., the case type of records) associated with the organization stored in the one or more data sources.

Disclosed embodiments may include configuring a record type; generating, for the record type and based on input data, the plurality of records; and configuring an object-level data security rule for the record type. In some embodiments, the object-level data security rule may indicate that a user group has permission to access the plurality of records. A record type may refer to, for example, any category, grouping, type, or classification of a record. In some examples, a person (e.g., an administrator associated with an organization) may use a computing device (e.g., the organization device 116) to configure the record type. For example, the person may specify a name of the record type, and/or data fields to be included in a record of the record type. The person may additionally or alternatively specify or configure the data type or other configurations for each of the data fields to be included in the record of the record type. The configured record type may be provided to the data management device 112, and may be used for creating records of the record type. One or more computing devices may generate, for the record type and based on input data, the plurality of records. The input data may include, for example, data entered by a user, or data received from other desired sources. In some examples, generating the plurality records may include processing the input data to determine the value for each data field of a record, and assigning the determined value to the data field.

In some examples, one or more computing devices may configure an object-level data security rule for the record type. The object-level data security rule may indicate that a user group has permission to access the plurality of records. For example, the object-level data security rule may include a role-based data security rule indicating that a user group including a number of users having a particular role in the organization has permission to access the plurality of records. In some examples, an administrator associated with the organization may add users to, or remove users from, the user group as members. Additionally or alternatively, the user group may include any desired members (e.g., associated with the organization).

Figure 6:
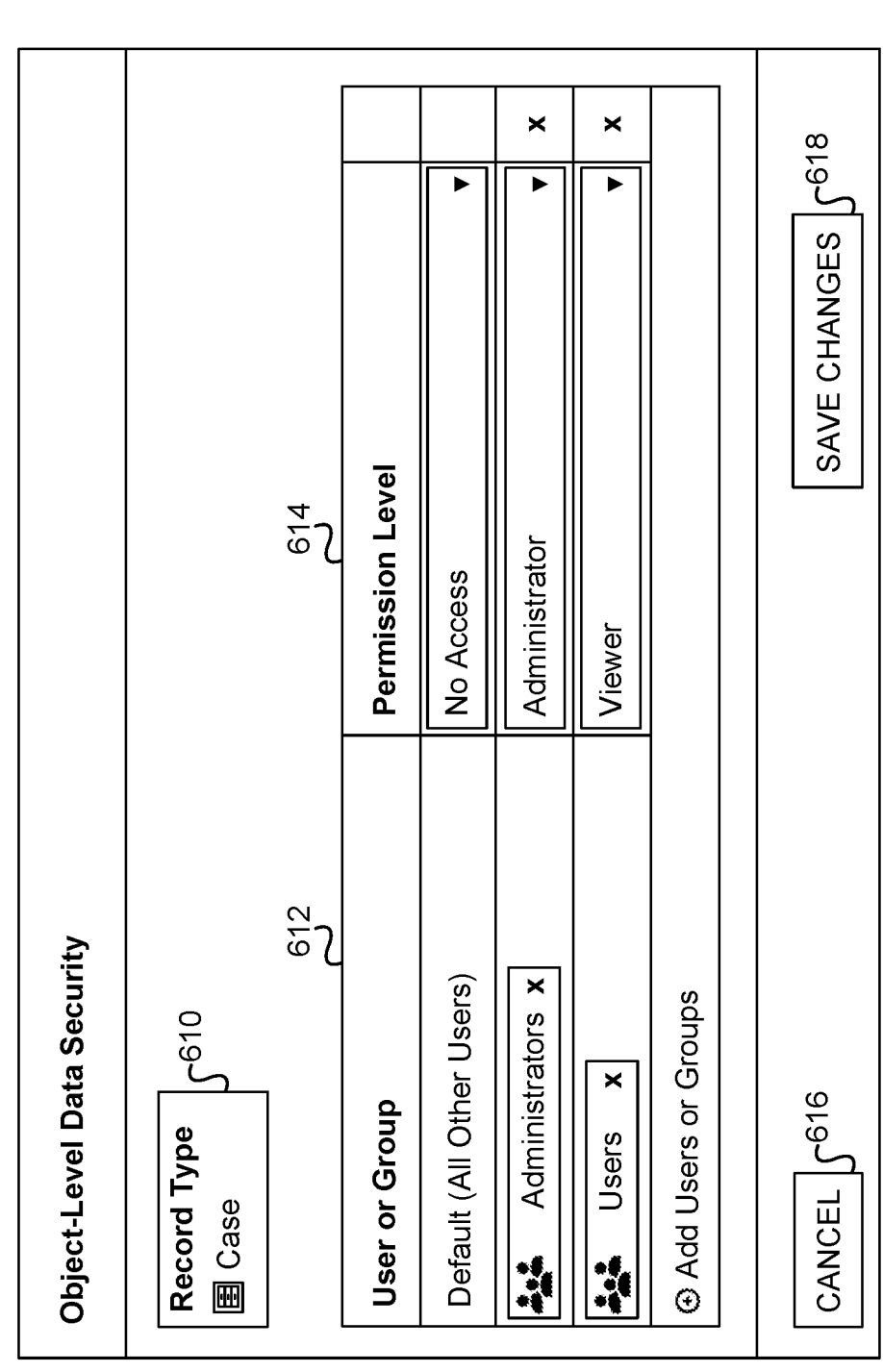
FIG. 6 shows an example user interface for configuring an object-level data security rule, consistent with some embodiments of the present disclosure.

FIG. 6 shows an example user interface 600 for configuring an object-level data security rule, consistent with some embodiments of the present disclosure. The user interface 600 may include, for example, a record type input 610, indicating that the record type to be configured for the object-level data security rule is the "Case" type. For the record type, one or more users or groups of users 612 may be identified, for example, including the "Administrators" group, the "Users" group, the "Default (All Other Users)" group, and/or other users or user groups. The permission level 614 corresponding to each of the users or user groups may be identified, for example, including "No Access," an "Administrator" level of access, a "Viewer" level of access, and/or other types of permission levels. A "cancel" button 616 may be used to cancel the configuration of the object-level data security rule. A "save changes" button 618 may be used to save the changes made to the object-level data security rule. The user interface 600 may be displayed, for example, via the organization device 116, for an administrator of the organization to configure the object-level data security rule for a type of record associated with the organization. In some examples, the object-level data security rule may allow the indicated users or user groups to have the configured permission to access all of the records of the type of record associated with the organization.

Disclosed embodiments may include activating the record-level data security rule to overlay or override the object-level data security rule for the plurality of records. For example, the record-level data security rule may be activated (e.g., by an administrator associated with the organization). Activating the record-level data security rule may cause the record-level data security rule to overlay or override the object-level data security rule for the plurality of records. As one example, overlaying the record-level data security rule on top of the object-level data security rule may include applying both the record-level data security rule and the object-level data security rule to the plurality of records. As another example, overriding the object-level data security rule by the record-level data security rule may include applying the record-level data security rule to the plurality of records, and deactivating or discontinuing the application of the object-level data security rule to the plurality of records.

Disclosed embodiments may include, after activating the record-level data security rule, configuring a second record-level data security rule that grants the user group permission to access one or more of the plurality of records. The second record-level data security rule may, for example, allow the functionalities of the overridden object-level data security rule to be reinstated, when the activated record-level data security rule is in place or when the record-level data security arrangement or functionality has been activated. For example, using the organization device 116, an administrator associated with the organization may input the second record-level data security rule (e.g., via a user interface), and the input second record-level data security rule may be transmitted to the data management device 112 to be used to manage the plurality or records. The second record-level data security rule may indicate that the user group including a number of users may have permission to access one or more of the plurality of records.

In some embodiments, the record-level data security rule may indicate security conditions. The security conditions may be based on one or more data fields in the plurality of records for comparison with specified values based on specified operators. For example, the security conditions may identify a data field for the type of records, and may cause comparison of the value of the data field of a record with a specified value based on a specified operator, to determine whether the security conditions are met by the record. The specified value and the specified operator may be configured by an individual using the system (e.g., an administrator associated with the organization via the organization device 116). The specified value may include any desired value (e.g., having a data type same as the data type of the corresponding data field). The specified operator may include, for example, equal to, not equal to, less than, greater than, less than or equal to, greater than or equal to, matching a value in a list of values, not matching any value in a list of values, being empty or null, not being empty or null, and/or any other desired operator. For example, a security condition may indicate that a record may be accessed if a date indicated in a date data field of the record is after a specific date. As another example, a security condition may indicate that a record may be accessed if a status indicated in a status data field of the record is an "active" status. In some examples, the security conditions may be applied to the records in addition to or as an alternative to the record-level data security rule(s) being applied to the records (and/or the object-level data security rule(s)). Disclosed embodiments may include denying access to the particular record of the plurality of records if the security conditions are not satisfied for the particular record. For example, if a user is permitted to access the particular record under the record-level data security rule(s) (and/or the object-level data security rules), but the particular record does not satisfy the security conditions applicable to the particular record, the user may be denied access to the particular record.

Figure 7:
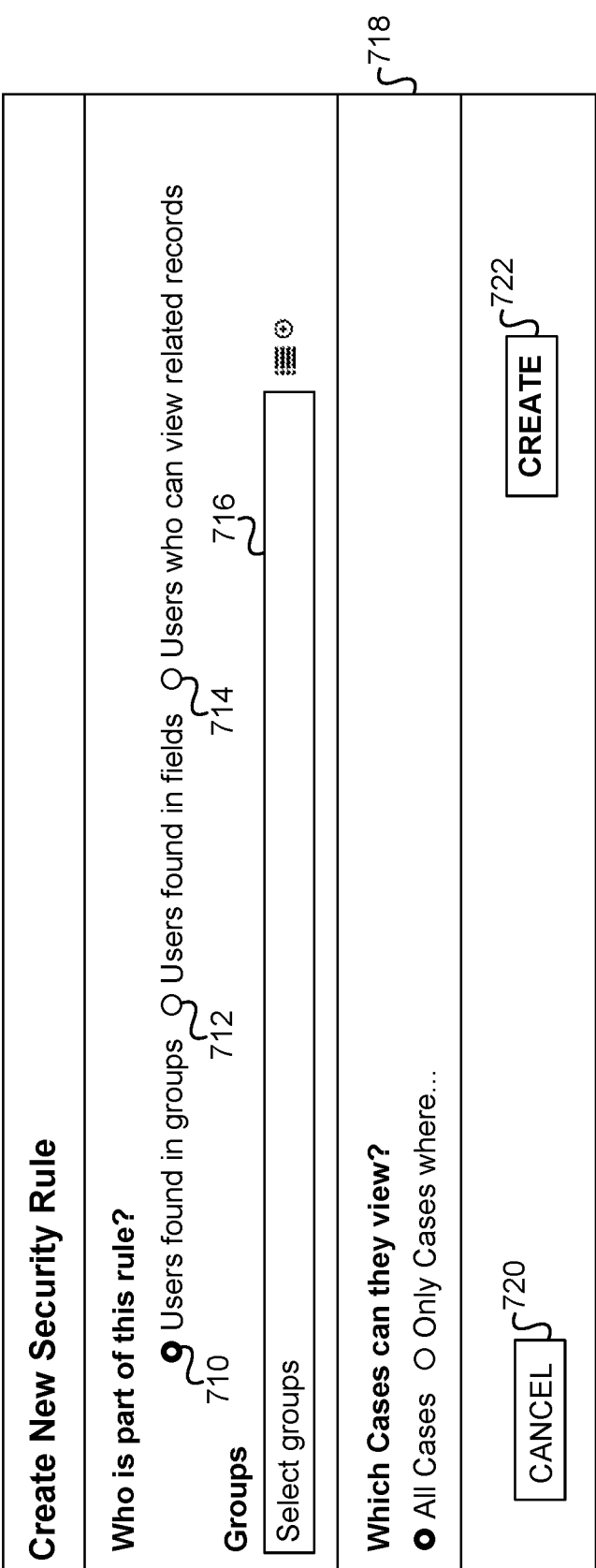
FIGS. 7-12 show example user interfaces for creating record-level data security rules, consistent with some embodiments of the present disclosure.
Figure 8:
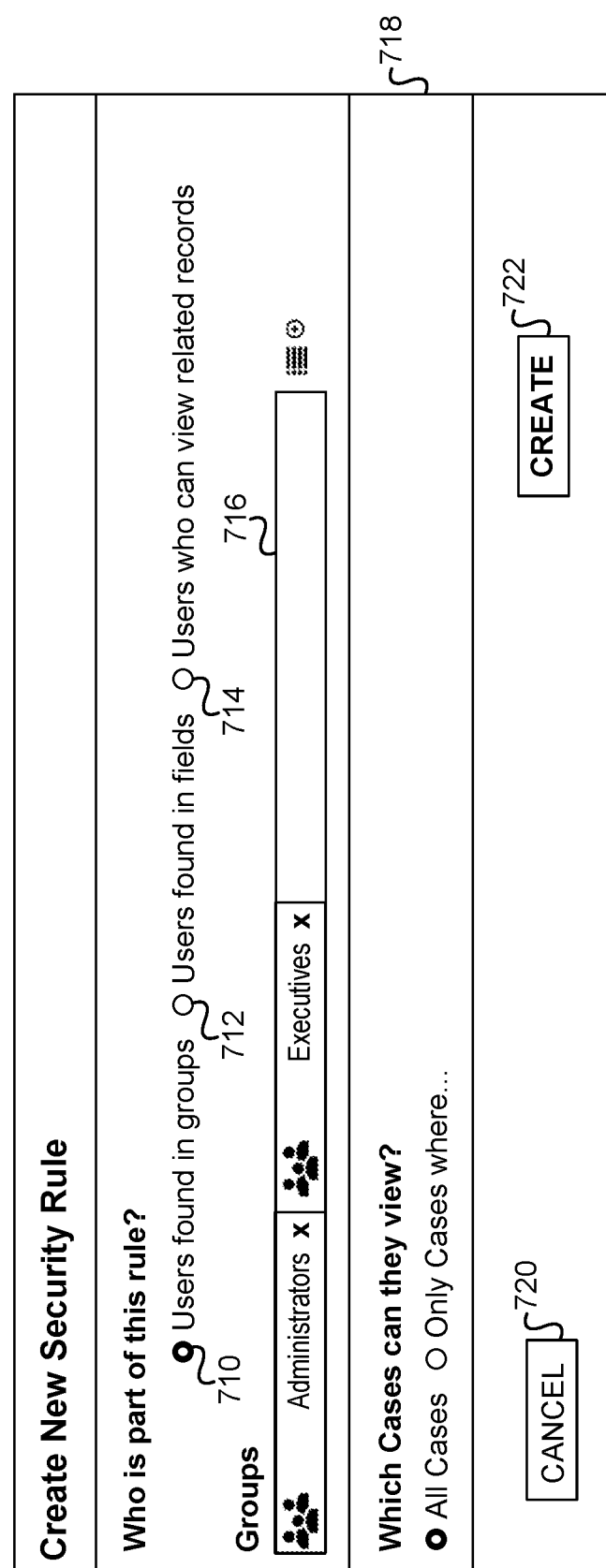

Disclosed embodiments may include causing a display of a user interface configured to allow user input of the record-level data security rule. The user interface may have any desired form (e.g., a user portal, a web portal, a pop-up window, a command-line interface, a graphical user interface, etc.). FIGS. 7-12 show example user interfaces for creating record-level data security rules, consistent with some embodiments of the present disclosure. The example user interfaces as shown in FIGS. 7-12 may be presented to, for example, an administrator associated with the organization via the organization device 116, to allow the administrator to configure or create the record-level data security rule(s) for a record type associated with the organization. With reference to FIG. 7, a user interface 700 for creating a record-level data security rule may include one or more options regarding the persons that are part of the rule, for example, including a "users found in groups" option 710, a "users found in fields" option 712, and a "users who can view related records" option 714. The user interface 700 may show that the "users found in groups" option 710 is selected, indicating that the record-level data security rule to be created may grant specified users or user groups the permission to access a type of records (e.g., the "case" type of records). A user interface element 716 may allow input of the users or user groups to be included in the record-level data security rule. A section 718 may allow the configuration of whether the record-level data security rule grants access to all of the records of the record type (e.g., the "all cases" selection), or those of the records of the record type that may satisfy additional security conditions (e.g., the "only cases where" selection). The user interface 700 may include a "cancel" button 720 used to cancel the configuration of the record-level data security rule, and may include a "create" button 722 used to create the record-level data security rule. With reference to FIG. 8, a user interface 800 may include one or more elements as shown in the user interface 700. The user interface 800 may show that an "administrators" group and an "executives" group have been added in the user interface element 716, so that the record-level data security rule to be created may include the "administrators" group and the "executives" group (e.g., who may be granted access to all of the records of the record type under the record-level data security rule).

Figure 9:
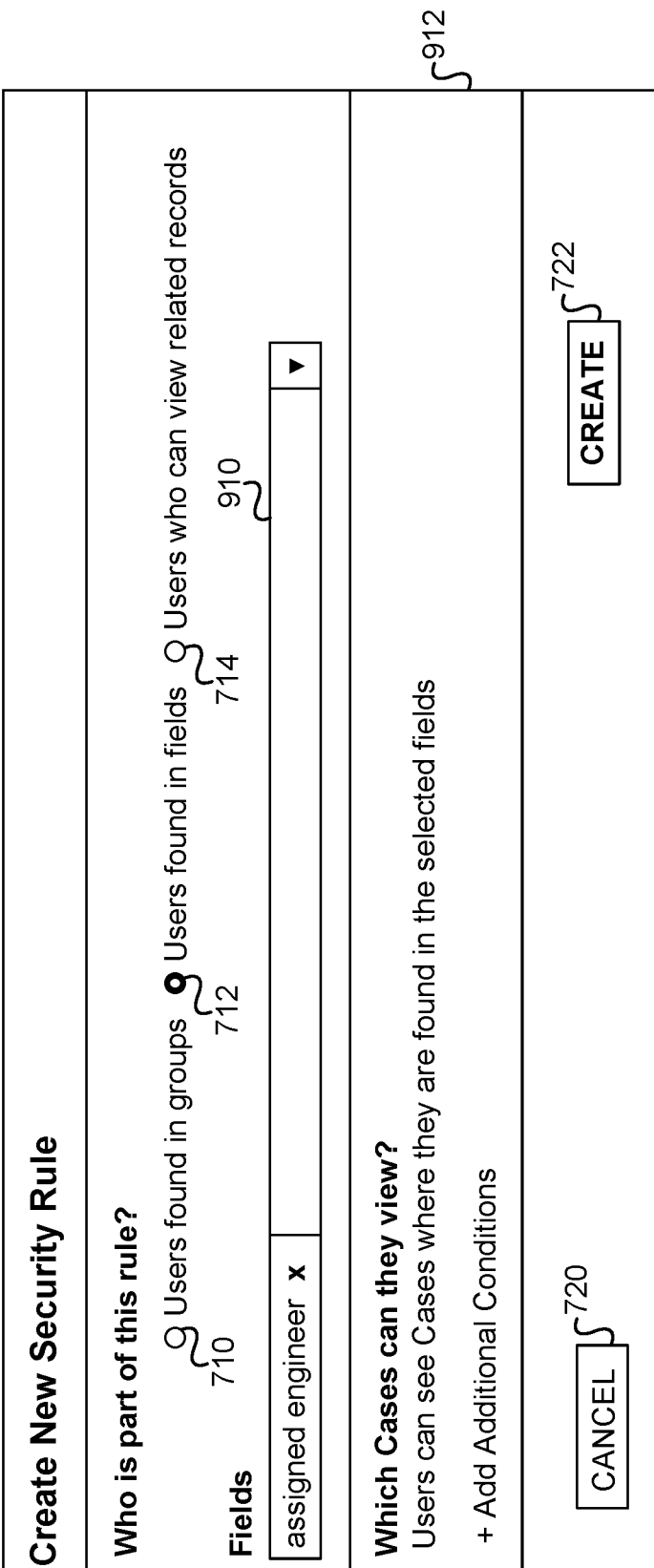

With reference to FIG. 9, a user interface 900 may include one or more elements as shown in the user interface 700. The user interface 900 may show that the "users found in fields" option 712 is selected, indicating that the record-level data security rule to be created may allow a user to access a record of the record type if the user is identified in a data field of the record. The user interface element 910 may allow input of an identification of one or more data fields for the type of records for the record-level data security rule (e.g., the "assigned engineer" data field is added in the user interface element 910). A section 912 may explain the functionality of the record-level data security rule, and also allow the addition of security conditions to the record-level data security rule (e.g., by activating the "add additional conditions" button in the section 912).

Figure 10:
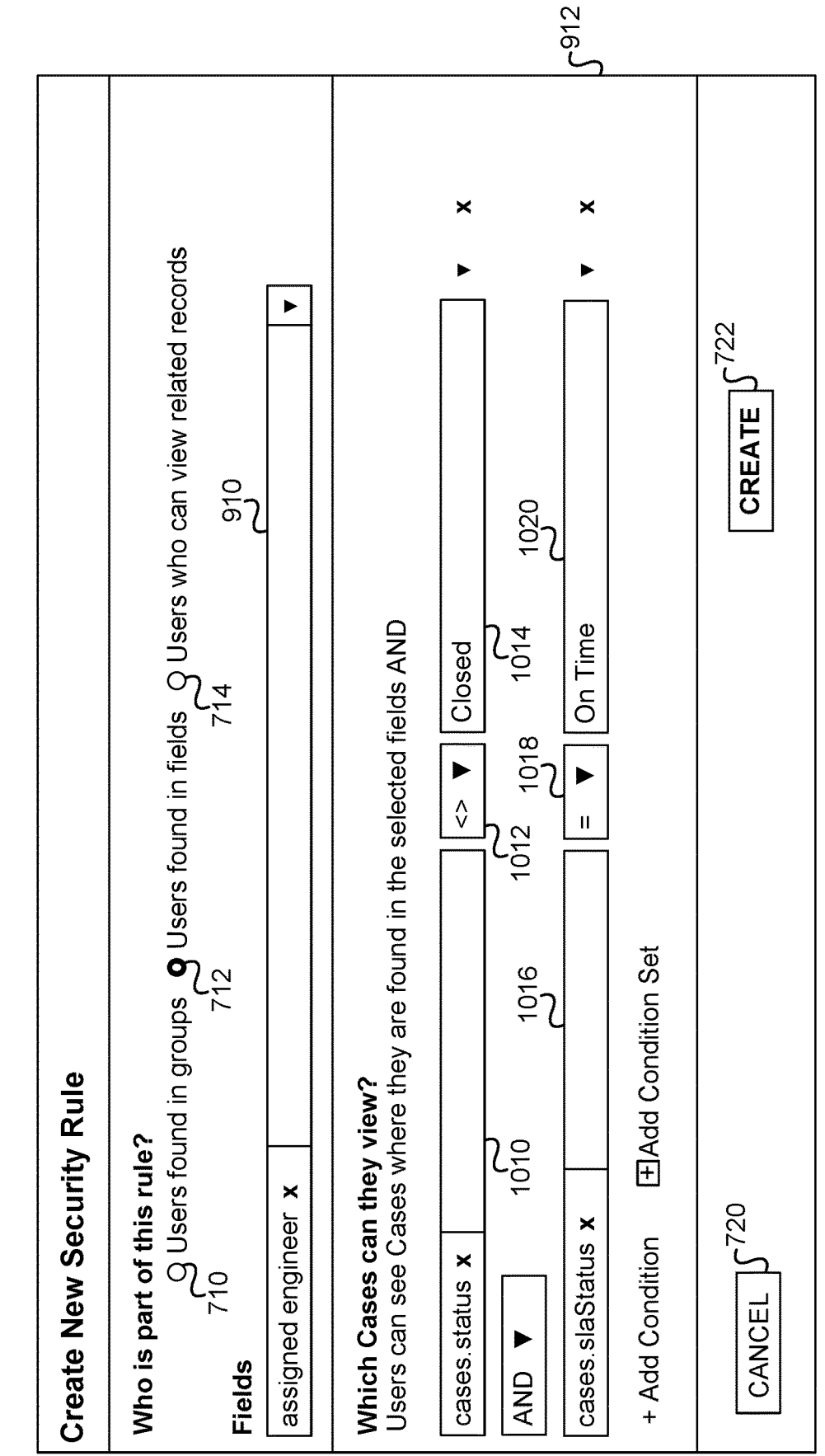

With reference to FIG. 10, a user interface 1000 may include one or more elements as shown in the user interface 900. The user interface 1000 may show that, in the section 912, security conditions are added to the record-level data security rule associated with the user interface element 910. For example, an added first security condition may indicate a determination of whether it is true that a "status" data field in the "case" type of records (e.g., as shown in an element 1010) is not equal to (e.g., as shown in an operator 1012) a "closed" status (e.g., as shown in a value 1014). In some examples, a record of the record type may not be accessed under the record-level data security rule associated with the user interface element 910, unless the record satisfies the added first security condition. As another example, an added second security condition may indicate a determination of whether it is true that an "SLA status" data field in the "case" type of records (e.g., as shown in an element 1016) is equal to (e.g., as shown in an operator 1018) an "on time" status (e.g., as shown in a value 1020). In some examples, a record of the record type may not be accessed under the record-level data security rule associated with the user interface element 910, unless the record satisfies the added second security condition. Additional or alternative security conditions may be included or added for the record-level data security rule associated with the user interface element 910.

Figure 11:
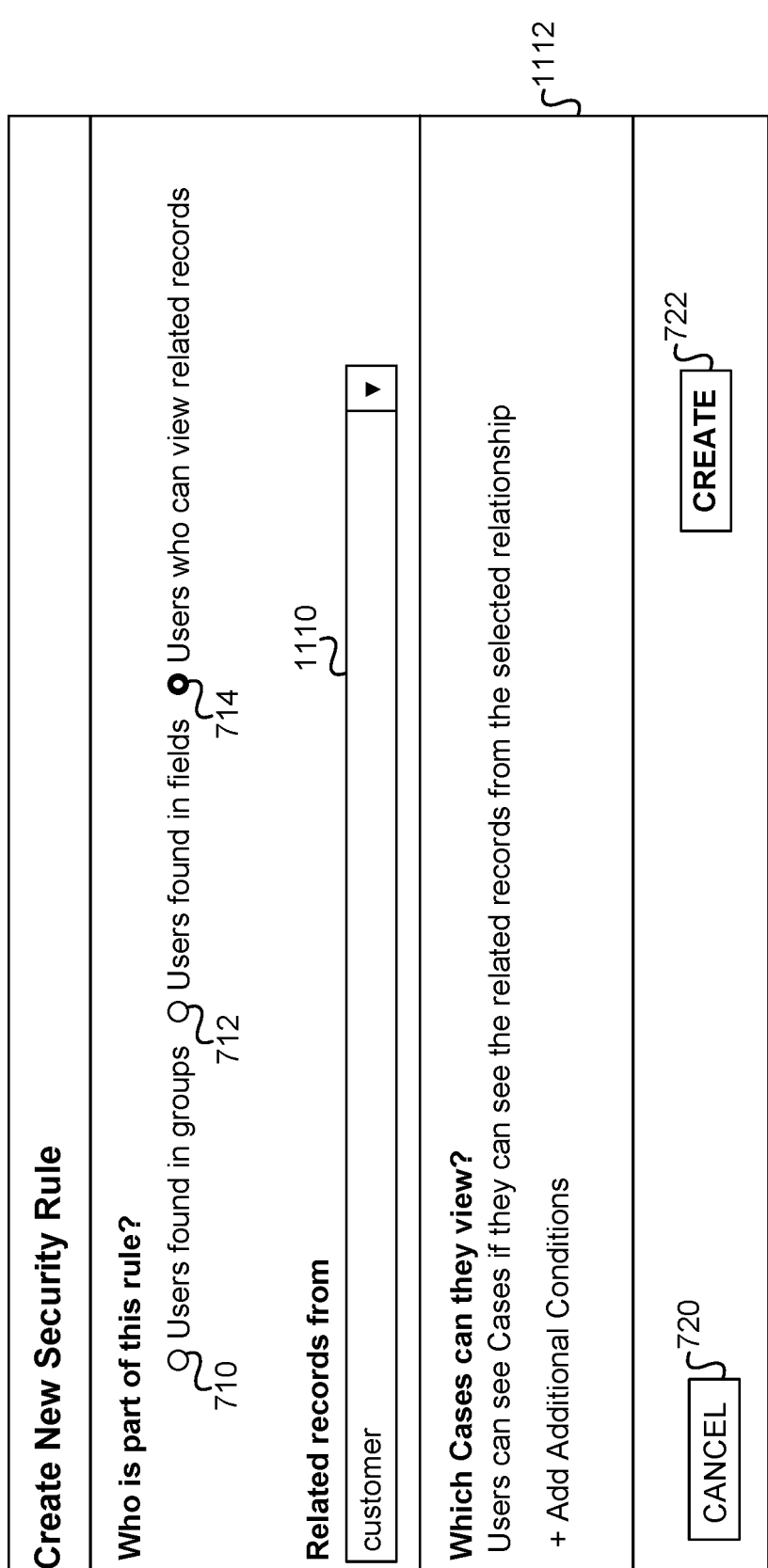

With reference to FIG. 11, a user interface 1100 may include one or more elements as shown in the user interface 700. The user interface 1100 may show that the "users who can view related records" option 714 is selected, indicating that the record-level data security rule to be created may allow a user to access a record of the record type if the user is permitted to access a second record, of a different record type, that is linked to the record (e.g., based on a data field of the record and/or the second record). The user interface element 1110 may allow input of an identification of one or more related record types and/or data fields for the record-level data security rule (e.g., the "customer" record type and/or data field is added in the user interface element 1110). A section 1112 may explain the functionality of the record-level data security rule, and also allow the addition of security conditions to the record-level data security rule (e.g., by activating the "add additional conditions" button in the section 1112).

Figure 12:
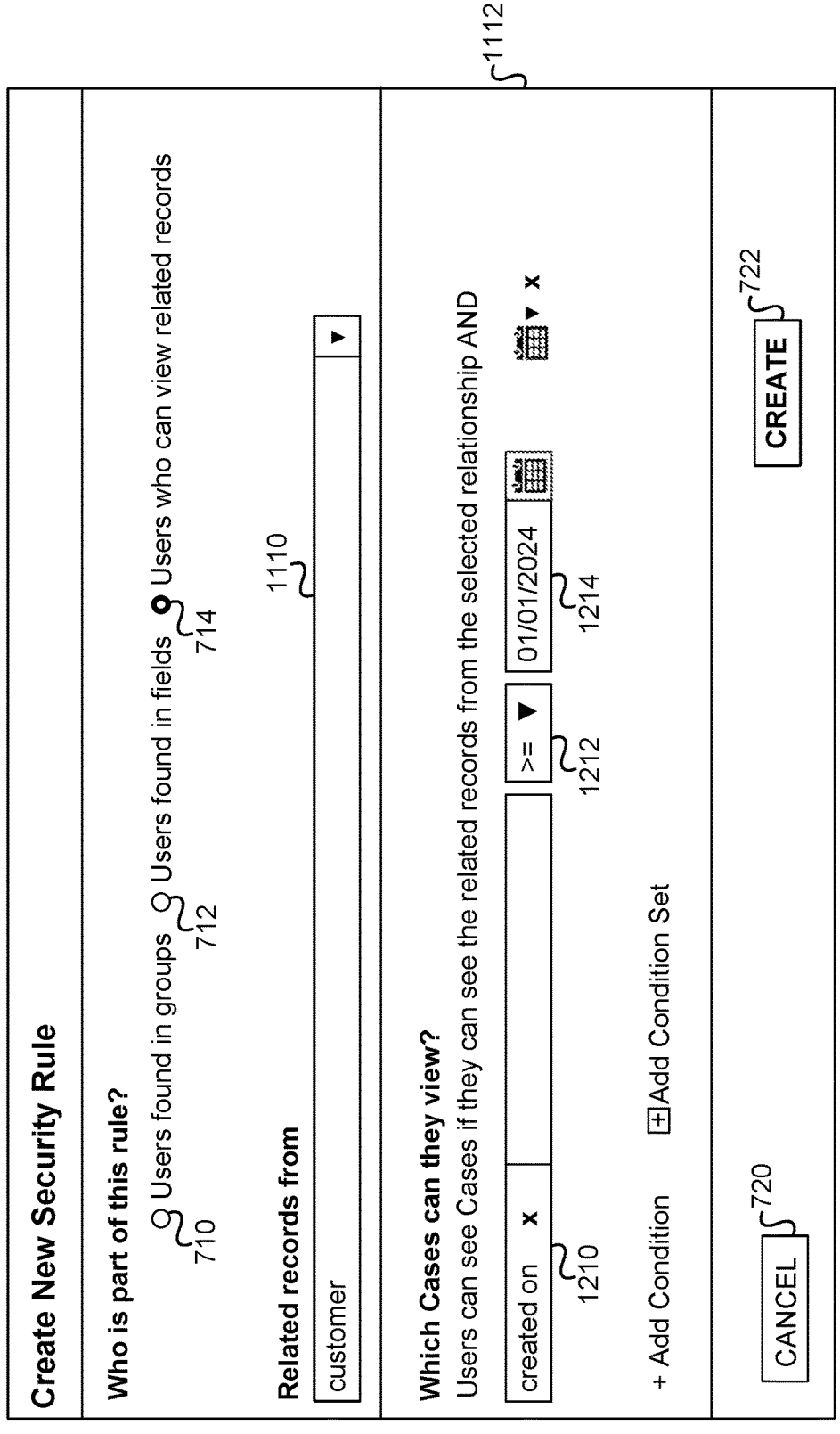

With reference to FIG. 12, a user interface 1200 may include one or more elements as shown in the user interface 1100. The user interface 1200 may show that, in the section 1112, security conditions are added to the record-level data security rule associated with the user interface element 1110. For example, an added security condition may indicate a determination of whether it is true that a "created on" data field in the "case" type of records (e.g., as shown in an element 1210) is greater than or equal to (e.g., as shown in an operator 1212) a "01/01/2024" date (e.g., as shown in a value 1214). In some examples, a record of the record type may not be accessed under the record-level data security rule associated with the user interface element 1110, unless the record satisfies the added security condition. Additional or alternative security conditions may be included or added for the record-level data security rule associated with the user interface element 1110.

In some embodiments, the record-level data security rule may have a first level of abstraction. Disclosed embodiments may include translating the record-level data security rule into one or more data security rules having a second level of abstraction lower than the first level. In some embodiments, determining whether the user is permitted to access the particular record may be based on the one or more data security rules. In some embodiments, the first level of abstraction may include a natural language, and the second level of abstraction may include a computer language. A natural language may refer to, for example, any language that may occur naturally in a human community. The natural language may be user-friendly and easy to understand to a user, and/or may be presented in a user interface to a user. A computer language may refer to, for example, any formal language used to communicate with a computer. A computer language may include, for example, a programming language, a machine language, software instructions, computer programs, computer code, executable instructions, source code, machine instructions, machine language programs, or any other type of directions for a computing device. In some examples, the record-level data security rule having the first level of abstraction may be more abstract, less concrete, less constructed, and/or less structured than the one or more data security rules having the second level of abstraction.

Translating the record-level data security rule having the first level of abstraction into the one or more data security rules having the second level of abstraction may include, for example, converting the natural language configurations to the computer language instructions, for simplification of the configuration of security by a user (e.g., an administrator associated with an organization with data stored in the one or more data sources). Translating the record-level data security rule having the first level of abstraction into the one or more data security rules having the second level of abstraction may use or be based on, for example, natural language processing techniques, computer code generation techniques, compiler techniques, techniques configured to parse natural language content to generate computer program code, artificial intelligence techniques configured to convert natural language content to computer instructions, techniques with configured rules or instructions to convert user interface input to computer executable instructions, techniques with configured rules or instructions to implement user interface input in a data security system, and/or other desired techniques. For example, the user may enter, via a user interface (e.g., displayed by or associated with the organization device 116), a data security rule having the first level of abstraction, where the user may identify who has permissions to access which records. Via the user interface, the user may select a user group who may access a set of records, specify that people indicated in a data field of a record may access the corresponding record, or specify that a person may access a record if the person has permission to access a second record related to the record. This data security rule in the natural language may be converted into computer language instructions that may be applied to data sources to enforce security rules. This may help simplify the user's configuration of security rules. For example, it may reduce the need for the user to configure each data source when there is an update, e.g., to user group members or people assigned to process a record.

In some examples, determining whether a person is permitted to access a particular record may be based on the one or more data security rules having the second level of abstraction. The one or more data security rules having the second level of abstraction may be applied to one or more data sources (e.g., the data sources 114A, 114B, 114C). With the record-level data security rules, the data security for an organization may be enhanced to have particularized data security, and the configuration of the data security for the organization may be simplified. For example, the data security rules having the second level of abstraction, as translated from the record-level data security rule, may be applied to the one or more data sources in which the data associated with the organization may be stored (e.g., the data sources 114A, 114B, 114C). When there are updates to the members in the user groups associated with the organization, or updates to the data fields of the records stored in the data sources, a user's permission to access the records may be automatically updated. For example, when a person is removed from a user group to which the permission to access a type of record is granted, the data security rules as applied to the data sources (e.g., by the data management device 112) may cease or stop allowing the person to access the type of record under the record-level data security rule associated with the user group. As another example, if a record-level data security rule is based on a data field of a record and the value of the data field in the record is updated, whether a person has permission to access the record may be determined based on the updated data field value under the record-level data security rule (e.g., when the person requests to access the record). In some examples, an update to the record-level data security rule may be applied to the data sources (e.g., by the data management device 112), so that the updated configuration of the record-level data security rule may be used when users request access to the data stored in the data sources.

Disclosed embodiments may include identifying, based on one or more record-level data security rules, a first set of records of the plurality of records. A first user may be permitted to access the first set of records. Disclosed embodiments may include identifying, based on one or more record-level data security rules, a second set of records of the plurality of records. A second user may be permitted to access the second set of records. The second set may be different from the first set. For example, a record-level data security rule may indicate that a user is permitted to access a record if the user is identified in a data field of the record. Different records of the plurality of records may have different values for the data field of the type of record. Thus, under the record-level data security rule, different users may be permitted to access different sets of records of the plurality of records. Additionally or alternatively, other types of record-level data security rules may be applied, and may contribute to different sets of records that may be accessible by different users. For example, with reference to FIG. 5, based on record-level data security rules, the engineer 550 may be permitted to access a set of records (e.g., the records with identifiers "CXWK31," "0F8VS9," "KVL1JQ," and "8YEFEC"), the account manager 552 may be permitted to access another set of records (e.g., the records with identifiers "BXE050" and "Q9FNE4"), and the administrator 554 may be permitted to access all of the records listed in the chart 510.

Figure 13:
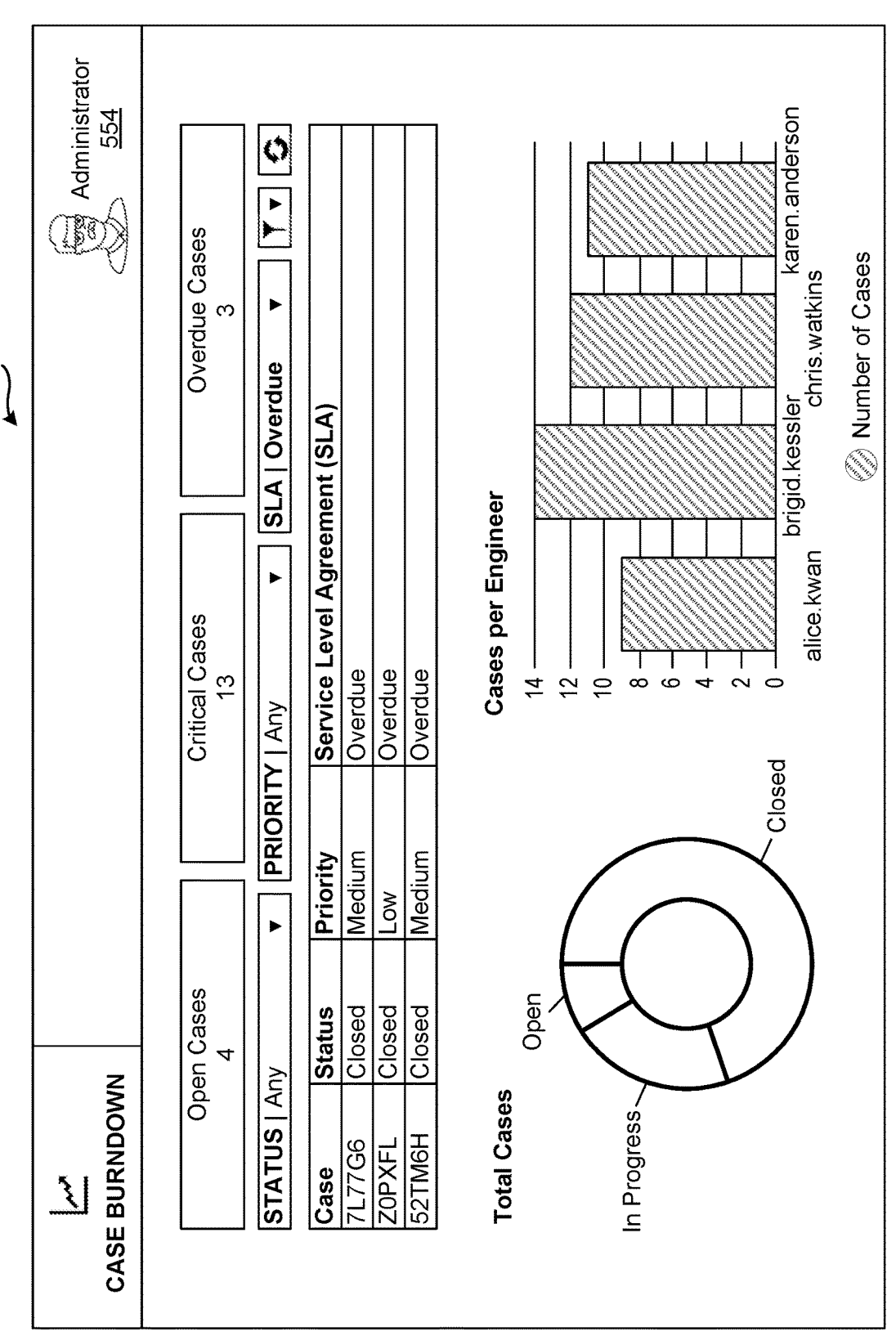
FIGS. 13-14 show example reports of aggregated information, consistent with some embodiments of the present disclosure.
Figure 14:
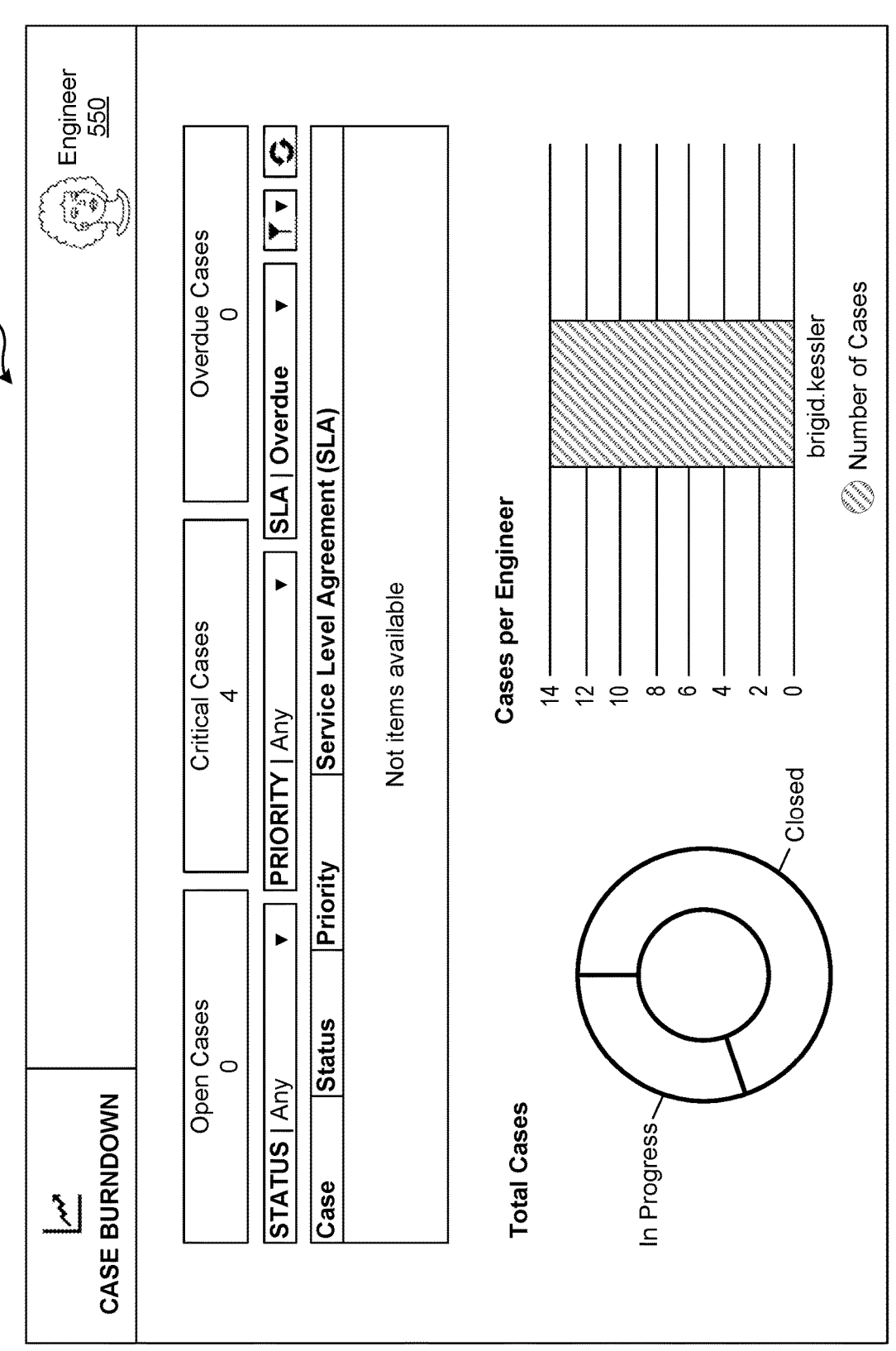

Disclosed embodiments may include generating, based on the first set of records, a first report of aggregated information. The first user may be permitted to access the first report. Disclosed embodiments may include generating, based on the second set of records, a second report of aggregated information. The second user may be permitted to access the second report. The second report may be different from the first report. The first report of aggregated information may include any type of summary, abstract, digest, outline, overview, note, review, excerpt, or other types of information based on the first set of records with respect to any desired aspects of the records. The second report of aggregated information may include any type of summary, abstract, digest, outline, overview, note, review, excerpt, or other types of information based on the second set of records with respect to any desired aspects of the records. FIGS. 13-14 show example reports of aggregated information, consistent with some embodiments of the present disclosure. With reference to FIG. 13, a report 1300 of aggregated information may be generated based on a set of records accessible by the administrator 554. The administrator 554 may be permitted to access the report 1300. With reference to FIG. 14, a report 1400 of aggregated information may be generated based on a set of records accessible by the engineer 550. The engineer 550 may be permitted to access the report 1400. The report 1300 may be different from the report 1400.

In some examples, the system (e.g., including one or more of the data sources 114A, 114B, 114C, the data management device 112, the user devices 118A, 118B, and/or the organization device 116) may allow the creation of a single record-level data security rule applicable to a record type associated with an organization. In some examples, the system may allow the creation of multiple record-level data security rules applicable to a record type associated with an organization. Adding and/or activating a record-level data security rule applicable to the record type may expand the scope of access permission to the record type (e.g., more users may be granted access to records of the record type when additional record-level data security rule(s) are added and/or activated). In some examples, the system may be configured to activate one, some, or all of multiple record-level data security rules applicable to the record type. In some examples, an individual (e.g., an administrator associated with the organization) may configure whether to activate a record-level data security rule (e.g., of the multiple record-level data security rules). In some examples, when multiple record-level data security rules are activated, the multiple record-level data security rules may apply to the record type in parallel (e.g., each of the multiple record-level data security rules may grant its own scope of user permission to access the record type).

In some examples, security expressions may be used to provide data security for the system, in place of record-level data security rules. The security expressions may include filter conditions to define which records of a record type are accessible by users. In some examples, each of the security expressions may define a condition that may need to be satisfied by a record, in order for the record to be accessible by corresponding user(s). When multiple security expressions including multiple conditions are configured for the system, the record may need to satisfy all of the conditions in order to be accessible by corresponding user(s). In some examples, the security expressions may be written or configured with a natural language, a programming language, a computer language, or any other desired type of language or format. In some examples, security expressions may be used to provide data security for the record type as an alternative to record-level data security rules.

Disclosed embodiments may include a non-transitory computer-readable medium including instructions that, when executed by at least one processor, cause the at least one processor to perform operations for particularized data security in a data storage environment. The operations may include storing a plurality of records in one or more data sources. Each record of the plurality of records may include one or more data fields. The operations may include identifying a record-level data security rule. The record-level data security rule may indicate user permission to access a record of the plurality of records based on a data field of the record. The operations may include applying the record-level data security rule to the one or more data sources; receiving a request by a user to access a particular record of the plurality of records; and based on the request and a data field of the particular record, in accordance with the record-level data security rule, determining whether the user is permitted to access the particular record. In some embodiments, the record-level data security rule may indicate that the user has permission to access the particular record if the user is identified in the data field of the particular record. In some embodiments, the operations may further include causing a display of a user interface configured to allow user input of the record-level data security rule.

Disclosed embodiments may include a method for particularized data security in a data storage environment. The method may include storing a plurality of records in one or more data sources. Each record of the plurality of records may include one or more data fields. The method may include identifying a record-level data security rule. The record-level data security rule may indicate user permission to access a record of the plurality of records based on a data field of the record. The method may include applying the record-level data security rule to the one or more data sources; receiving a request by a user to access a particular record of the plurality of records; and based on the request and a data field of the particular record, in accordance with the record-level data security rule, determining whether the user is permitted to access the particular record. In some embodiments, the record-level data security rule may indicate that the user has permission to access the particular record if the user is identified in the data field of the particular record. In some embodiments, the method may further include causing a display of a user interface configured to allow user input of the record-level data security rule.

FIG. 4 shows an example method 400 for visibility for particularized data security, consistent with some embodiments of the present disclosure. With reference to FIG. 4, and as further discussed in detail below, in step 410, one or more computing devices may identify one or more data security rules for a type of record. The one or more data security rules may relate to one or more data sources. A record of the type may include a plurality of data items. In step 412, the one or more computing devices may receive a request by a first user to access a particular record of the type of record. In step 414, the one or more computing devices may determine, based on the one or more data security rules and the request by the first user, that the first user is permitted to access the particular record. In step 416, the one or more computing devices may identify visibility configurations for the type of record. The visibility configurations may indicate different sets of one or more data items, selected from the plurality of data items, for different types of users. In step 418, the one or more computing devices may determine, based on the visibility configurations and a user type of the first user, a first set of one or more data items of the plurality of data items. In step 420, the one or more computing devices may, based on the request by the first user, cause a display, via a first user interface, of the first set of one or more data items.

Disclosed embodiments may include a system for particularized data security in a data storage environment. The system may include at least one non-transitory storage medium configured to store program code, and at least one hardware processor configured to execute the program code to perform operations as described herein. A data storage environment may refer to, for example, any type of environment or system configured to store data or information and/or associated with storing data or information. For example, a data storage environment may include one or more computing devices associated with storing data (e.g., one or more of the data sources 114A, 114B, 114C, the data management device 112, the user devices 118A, 118B, and/or the organization device 116). Particularized data security may refer to, for example, securing data with specific or particular configurations related to security. Particularized data security may include, for example, data security as specific as at a data record level or at a data field level, or being specific to particular users, user groups, and/or organizations. Particularized data security may include, for example, data security based on record-level data security rules (e.g., including enforcing data security rules), and/or visibility configurations of data records for different users (e.g., including generating views of data), as described herein. A non-transitory storage medium may include, for example, a non-transitory computer-readable medium. Program code may include, for example, instructions, software instructions, computer programs, computer code, executable instructions, source code, machine instructions, machine language programs, or any other type of directions for a computing device. The program code may be based on one or more of various types of desired programming languages, and may include (e.g., embody) various processes for particularized data security as described herein. A hardware processor (e.g., the processor 212) may be configured to execute instructions of a computer program to perform the functions described herein.

Disclosed embodiments may include identifying one or more data security rules for a type of record, in accordance with step 410. The one or more data security rules may relate to one or more data sources. A record of the type may include a plurality of data items. A data security rule may refer to, for example, any type of command, rule, direction, or instruction associated with data security. The data security rule may include, for example, a record-level data security rule, an object-level data security rule, and/or any other type of data security rule. The type of record may be configured by a person (e.g., an administrator associated with an organization). For example, the administrator may define, specify, or configure a name of the record type, and/or data field(s) or data item(s) to be included in the type of record. In some examples, the one or more security rules may be applied to one or more data sources in which the data associated with the organization may be stored (e.g., the data sources 114A, 114B, 114C). A data item may refer to, for example, any type of collection, grouping, organization, or piece of data or information that may be included in a record.

In some embodiments, the plurality of data items may include an information item or an actionable item. An information item may include, for example, any type of data item with information that may be displayed to, viewed by, and/or perceived by a user. For example, the information item may include textual data, numerical data, image data, video data, audio data, and/or any other type of data that may provide information to a user. In some embodiments, the actionable item may be configured to trigger one or more processes executable by the at least one hardware processor. For example, the actionable item may include a button, a link, a hyperlink, an icon, a notification, an application programing interface (API), a symbol, a function, a file, a shortcut, a file shortcut, a window, a menu, a tool, an application, and/or any other entity that may be activated or interacted with by a user. Activating the actionable item (e.g., by clicking on the actionable item) may cause the at least one hardware processor to execute one or more processes associated with the actionable item (e.g., function(s) of the actionable item). In some embodiments, the plurality of data items may include a plurality of tabs in a user interface. A tab may refer to, for example, a graphical user interface element that may allow multiple documents, panels, or information pieces to be contained within a single window. Tabs may be used as a navigational tool for switching between sets of documents or information pieces. Tabs may be used in the user interface (e.g., a web browser, a web application, a text editor, a document viewer or browser, a document reader, a file manager, an e-book reader, a cloud storage application, and/or any other type of user interface). In some examples, each data item of the plurality of data items may include or correspond to a tab of the plurality of tabs in the user interface.

Disclosed embodiments may include receiving a request by a first user to access a particular record of the type of record, in accordance with step 412. For example, via the user device 118A, a first user may send, to the data management device 112 and/or the one or more data sources 114A, 114B, 114C, a request to access a particular record of the type of record. In some examples, the request may include an identifier of the particular record that the first user may request access to, identification information of the first user, authentication information of the first user, a timestamp associated with transmitting the request, and/or any other desired information. In some examples, the data management device 112 may cause a display of a user interface via the user device 118A, and the user interface may allow the first user to enter the request to access the particular record. For example, to generate a request to access the particular record, the first user may, via the user interface, enter an identifier of the particular record, select an identifier of the particular record from a listing of record identifiers, or perform any other suitable action. The data management device 112 and/or the one or more data sources 114A, 114B, 114C may receive the request by the first user to access the particular record of the type of record.

Disclosed embodiments may include determining, based on the one or more data security rules and the request by the first user, that the first user is permitted to access the particular record, in accordance with step 414. For example, the request may indicate the identity of the first user, and the identity of the first user may be used by the data management device 112 and/or the one or more data sources 114A, 114B, 114C to determine whether the first user is permitted to access the particular record. The one or more data security rules may indicate how the identity of the first user may be used to determine whether the first user is permitted to access the particular record. For example, the one or more data security rules may include a record-level data security rule as described herein. Based on the record-level data security rule, and the identity of the first user, it may be determined that the first user is permitted to access the particular record. In some examples, the one or more data security rules may include other desired type(s) of data security rule(s) (e.g., an object-level data security rule), which may be used to determine that the first user is permitted to access the particular record.

Disclosed embodiments may include identifying visibility configurations for the type of record, in accordance with step 416. The visibility configurations may indicate different sets of one or more data items, selected from the plurality of data items, for different types of users. The visibility configurations may refer to, for example, any type of arrangement, design, organization, pattern, or structure associated with viewing, accessing, or interacting with data. The visibility configurations may be added, updated, or modified for the type of record (e.g., by an administrator via the organization device 116). In some examples, different types of records may have their respective sets of visibility configurations. The visibility configurations may be stored in, and/or identified by, the data management device 112 and/or the data sources 114A, 114B, 114C.

For different types of users, the visibility configurations may indicate different sets of data item(s) (e.g., as selected from the plurality of data items included in the type of record). Based on the visibility configurations, the different types of users may be permitted to view, access, or interact with different sets of data item(s) (e.g., for any accessible record of the type of record). For example, if each record of the type of record is configured with and/or includes five (5) data items (e.g., data item A, data item B, data item C, data item D, and data item E), the visibility configurations may indicate that a first type of user may be permitted to view, access, or interact with a first set of data items (e.g., data item A, data item B, and data item C) for any accessible record of the record type, and a second type of user may be permitted to view, access, or interact with a second set of data items (e.g., data item B, data item C, and data item E) for any accessible record of the record type. With the visibility configurations, when two users of two different types both have access to a particular record of the record type, the two users may be permitted to view, access, or interact with different sets of data items of the particular record. In some examples, the visibility configurations may include specific configurations for an individual user. For example, the user may have an individualized configuration of a set of data item(s), selected from the plurality of data items included in the type of record, that the user may be permitted to view, access, or interact with for the type of record.

In some examples, the visibility configurations may additionally or alternatively indicate what actions a user or a type of user may be permitted to take regarding a record of the type, regarding the type of record, regarding one or more particular data items of the type of record, and/or regarding other aspects associated with the type of record. If the visibility configurations are applied to a record to which a user may request access, the user may be permitted to take actions regarding the record according to the visibility configurations. For example, the visibility configurations may indicate that the user may be permitted to view a particular data item of the record, and that the user may not be permitted to edit, update, change, or take any other action regarding, the particular data item of the record. Thus, the user may access the particular record according the visibility configurations specifying permitted and/or prohibited user actions regarding the particular record.

Disclosed embodiments may include determining, based on the visibility configurations and a user type of the first user, a first set of one or more data items of the plurality of data items, in accordance with step 418. For example, the data management device 112 and/or the data sources 114A, 114B, 114C may determine the user type of the first user. The user type of the first user may be determined based on, for example, a mapping of the identity of the first user to the corresponding user type. In some examples, the user type of the first user may include a user group of which the first user may be a member, a role of the first user within the organization to which the first user may belong, or any other type of classification, categorization, or grouping for the first user. The visibility configurations may indicate a mapping from a user type to its corresponding set of data item(s) of the plurality of data items included in the type of record. The data management device 112 and/or the data sources 114A, 114B, 114C may, using the visibility configurations, map the user type of the first user to the corresponding first set of one or more data items of the plurality of data items, and may also determine the content of the first set of one or more data items based on the particular record that the first user may be permitted to access. For example, the content of the first set of data item(s) may be extracted from the particular record.

Disclosed embodiments may include, based on the request by the first user, causing a display, via a first user interface, of the first set of one or more data items, in accordance with step 420. For example, in response to the request by the first user, and the determining of the first set of one or more data items, the data management device 112 and/or the data sources 114A, 114B, 114C may cause a display, via the first user interface, of the first set of one or more data items. The data management device 112 and/or the data sources 114A, 114B, 114C may transmit, to the user device 118A, the first set of one or more data items (e.g., including the content of the first set of one or more data items as determined based on the particular record that the first user is permitted to access). The user device 118A may display the first user interface to show the first set of one or more data items for the particular record that the first user is permitted to access (e.g., including the content of the first set of one or more data items), in response to the request by the first user. In some embodiments, the first user interface may include a web browser. A web browser may refer to, for example, any application or functionality for accessing websites or other sources associated with a network. In some examples, the first user may request to access the particular record via the web browser, and may access, view, or interact with, via the web browser, the received first set of data item(s) of the particular record.

Disclosed embodiments may include receiving a request by a second user to access the particular record. For example, via the user device 118B, a second user may send, to the data management device 112 and/or the one or more data sources 114A, 114B, 114C, a request to access the particular record of the type of record (e.g., which the first user may also request access to). In some examples, the request by the second user may include an identifier of the particular record that the second user may request access to, identification information of the second user, authentication information of the second user, a timestamp associated with transmitting the request, and/or any other desired information. In some examples, the data management device 112 may cause a display of a user interface via the user device 118B, and the user interface may allow the second user to enter the request to access the particular record. For example, to generate a request to access the particular record, the second user may, via the user interface, enter an identifier of the particular record, select an identifier of the particular record from a listing of record identifiers, or perform any other suitable action. The data management device 112 and/or the one or more data sources 114A, 114B, 114C may receive the request by the second user to access the particular record of the type of record.

Disclosed embodiments may include determining, based on the one or more data security rules and the request by the second user, that the second user is permitted to access the particular record. The determining that the second user is permitted to access the particular record may be performed in a similar manner as the determining that the first user is permitted to access the particular record. For example, the one or more data security rules may include record-level data security rules, object-level data security rules, and/or other types of data security rules, and the one or more data security rules may be used to determine the second user's permission to access the particular record, in view of the identity of the second user (e.g., as indicated in the request by the second user).

Disclosed embodiments may include determining, based on the visibility configurations and a user type of the second user, a second set of one or more data items of the plurality of data items. The second set may be different from the first set. For example, the data management device 112 and/or the data sources 114A, 114B, 114C may determine the user type of the second user. The user type of the second user may be determined based on, for example, a mapping of the identity of the second user to the corresponding user type. In some examples, the user type of the second user may include a user group of which the second user may be a member, a role of the second user within the organization to which the second user may belong, or any other type of classification, categorization, or grouping for the second user. The visibility configurations may indicate a mapping from a user type to its corresponding set of data item(s) of the plurality of data items included in the type of record. The data management device 112 and/or the data sources 114A, 114B, 114C may, using the visibility configurations, map the user type of the second user to the corresponding second set of one or more data items of the plurality of data items, and may also determine the content of the second set of one or more data items based on the particular record that the second user may be permitted to access. For example, the content of the second set of data item(s) may be extracted from the particular record.

The second set of data item(s) (e.g., associated with the second user) may be different from the first set of data item(s) (e.g., associated with the first user), when the first user and the second user both may request access to the same particular record. In some examples, the first set and the second set may not include overlapping data items. In some examples, the first set and the second set may include overlapping data item(s), and may also include non-overlapping data item(s). In some examples, the first set and the second set may be the same (e.g., the same visibility configuration may be configured for the two user types associated with the first user and the second user).

Disclosed embodiments may include, based on the request by the second user, causing a display, via a second user interface, of the second set of one or more data items. For example, in response to the request by the second user, and the determining of the second set of one or more data items, the data management device 112 and/or the data sources 114A, 114B, 114C may cause a display, via the second user interface, of the second set of one or more data items. The data management device 112 and/or the data sources 114A, 114B, 114C may transmit, to the user device 118B, the second set of one or more data items (e.g., including the content of the second set of one or more data items as determined based on the particular record that the second user is permitted to access). The user device 118B may display the second user interface to show the second set of one or more data items for the particular record that the second user is permitted to access (e.g., including the content of the second set of one or more data items), in response to the request by the second user.

Figures 15, 16:
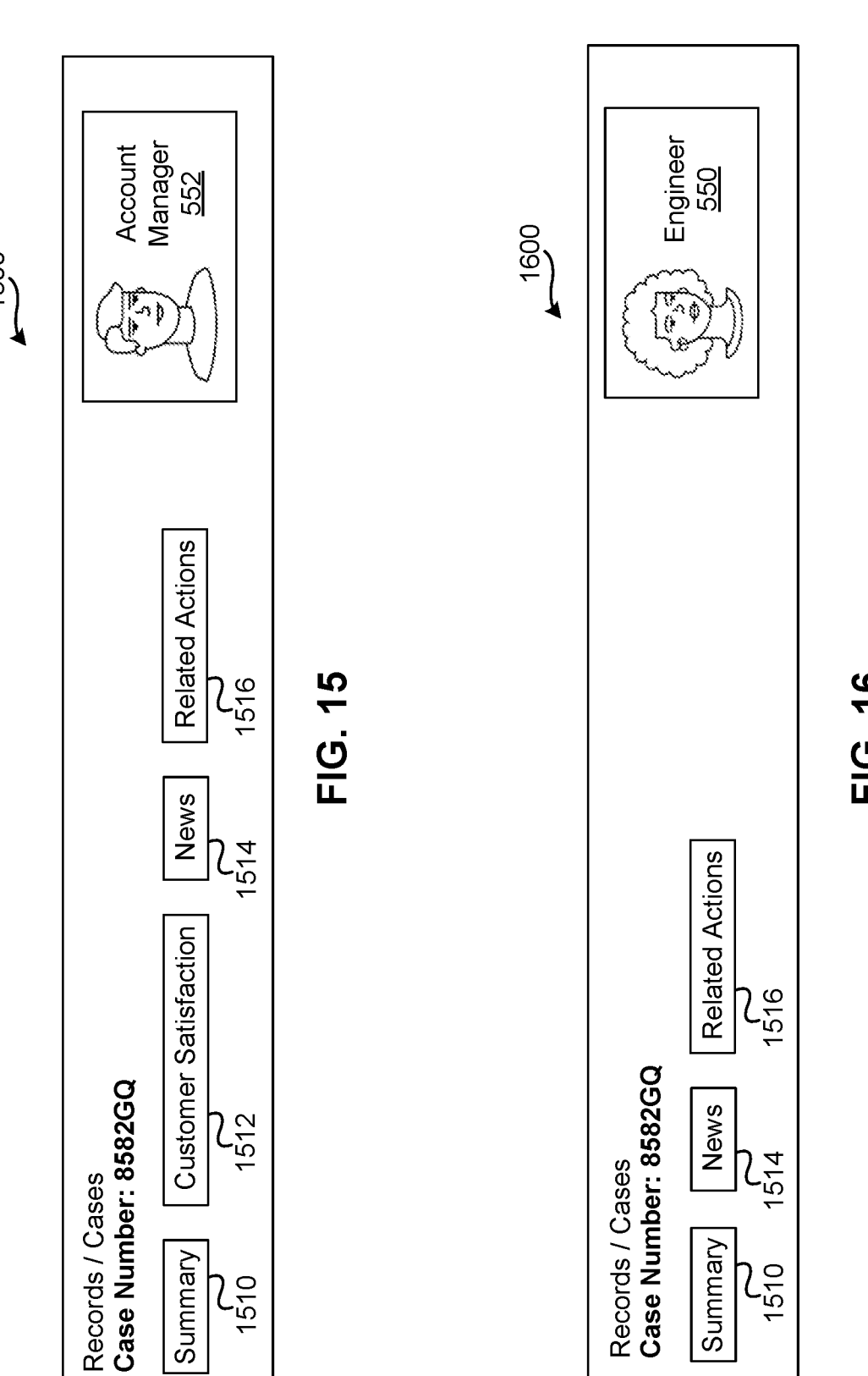
FIGS. 15-16 show example user interfaces of records based on visibility configurations, consistent with some embodiments of the present disclosure.

FIGS. 15-16 show example user interfaces of records based on visibility configurations, consistent with some embodiments of the present disclosure. With reference to FIG. 15, a user interface 1500 may show a record which the account manager 552 may request to access. The record shown in the user interface 1500 may include a "case" type of record, with a case number of "8582GQ." Based on visibility configurations and a user type of the account manager 552 (e.g., the user type being account manager), a set of data item(s) of the case record "8582GQ" may be accessible by or displayed to the account manager 552, and the set of data item(s) may include a summary section 1510, a customer satisfaction section 1512, a news section 1514, and a related actions section 1516. In some examples, the summary section 1510, the customer satisfaction section 1512, the news section 1514, and the related actions section 1516 may be presented as tabs, links, buttons, or other desired user interface elements.

With reference to FIG. 16, a user interface 1600 may show a record which the engineer 550 may request to access. The record shown in the user interface 1600 may include a "case" type of record, with the case number of "8582GQ" (e.g., the record requested in connection with the user interface 1600 may be the same record as the record requested in connection with the user interface 1500). Based on visibility configurations and a user type of the engineer 550 (e.g., the user type being engineer), a set of data item(s) of the case record "8582GQ" may be accessible by or displayed to the engineer 550, and the set of data item(s) may include the summary section 1510, the news section 1514, and the related actions section 1516. In some examples, the summary section 1510, the news section 1514, and the related actions section 1516 may be presented as tabs, links, buttons, or other desired user interface elements.

Based on the visibility configurations, the sets of data item(s), of the same requested record, to be accessible by, displayed to, or viewed by different users or different types of users (e.g., the account manager 552 and the engineer 550) may be different. For example, the customer satisfaction section 1512 may be accessible or viewed by the account manager 552 and may not be accessible or viewed by the engineer 550, while both the account manager 552 and the engineer 550 may be permitted to access and view the summary section 1510, the news section 1514, and the related actions section 1516 for the requested record.

Disclosed embodiments may include receiving, from a second user, an indication to share security permissions associated with the second user for the particular record with the first user. Disclosed embodiments may include, based on the indication, causing a display, via the first user interface, of a second set of one or more data items of the plurality of data items. The second set may be different from the first set. For example, the second user may send, via the user device 118B and to the data management device 112 and/or the data sources 114A, 114B, 114C, a request to share the second user's security permissions for the particular record with the first user. The second set of data item(s) of the particular record may be accessible by the second user and, based on the sharing of security permissions, the first user may be allowed to access the second set of data item(s) of the particular record. When the first user requests access to the particular record, the first user interface may be displayed to show the second set of data item(s) of the particular record to the first user (e.g., via the user device 118A). The second set of data item(s) based on the sharing of security permissions may be different from the first set of data item(s) that the first user was permitted to access before the sharing of security permissions for the particular record. For example, the sharing of security permissions may allow the first user to access additional data item(s), of the particular record, that the first user was not permitted to access before the sharing of security permissions for the particular record.

Disclosed embodiments may include identifying, in the visibility configurations, one or more rules for the user type of the first user. The one or more rules may indicate a default set of data items, of the plurality of data items, to be displayed for the user type of the first user. The one or more rules indicated in the visibility configurations for the user type of the first user may include any type of instructions, directions, or configurations for the user type of the first user. The one or more rules may indicate a default set of data items for the type of record. The default set of data items may be accessed by or displayed to the user type of the first user, for a record of the record type requested by the first user. In some examples, the default set of data items may include some or all of the plurality of data items included in the type of record. In some examples, the default set of data items may include a set of basic data items for the type of record, without data items having sensitive information. In some examples, the default set of data items may include the data item(s), of the plurality of data items included in the type of record, that may be designated or indicated with a relatively low significance or priority related to data security.

Disclosed embodiments may include updating the one or more rules for the user type of the first user by changing the default set of data items to be displayed for the user type of the first user. The one or more rules for the user type of the first user may be updated to add data items to, or remove data items from, the default set of data items. For example, an individual (e.g., an administrator associated with the organization) may cause adjustment to the default set of data items using the organization device 116. The update to the default set of data items may allow users of the user type of the first user to have access to an increased set of data items for the type of record or a reduced set of data items for the type of record.

Disclosed embodiments may also include generating a plurality of records based on input data; and permitting or denying access to the plurality of records, based on the one or more data security rules. One or more computing devices may generate, based on input data, a plurality of records (e.g., for a record type). The input data may include, for example, data entered by a user, or data received from other desired sources. In some examples, generating the plurality records may include processing the input data to determine the value for each data field of a record, and assigning the determined value to the data field. The one or more data security rules may include record-level data security rules, object-level data security rules, and/or other types of data security rules. It may be determined whether to permit or deny access to the plurality of records based on the one or more data security rules, as described herein.

Disclosed embodiments may include identifying, based on the one or more data security rules, a first set of records of the plurality of records. The first user may be permitted to access the first set of records. Disclosed embodiments may include identifying, based on the one or more data security rules, a second set of records of the plurality of records. A second user may be permitted to access the second set of records. The second set of records may be different from the first set of records. For example, a record-level data security rule may indicate that a user is permitted to access a record if the user is identified in a data field of the record. Different records of the plurality of records may have different values for the data field of the type of record. Thus, under the record-level data security rule, different users may be permitted to access different sets of records of the plurality of records. Additionally or alternatively, other types of record-level data security rules may be applied, and may contribute to different sets of records that may be accessible by different users. For example, with reference to FIG. 5, based on record-level data security rules, the engineer 550 may be permitted to access a set of records (e.g., the records with identifiers "CXWK31," "0F8VS9," "KVL1JQ," and "8YEFEC"), the account manager 552 may be permitted to access another set of records (e.g., the records with identifiers "BXE050" and "Q9FNE4"), and the administrator 554 may be permitted to access all of the records listed in the chart 510.

Disclosed embodiments may include generating, based on the first set of records, a first report of aggregated information. The first user may be permitted to access the first report. Disclosed embodiments may include generating, based on the second set of records, a second report of aggregated information. The second user may be permitted to access the second report. The second report may be different from the first report. The first report of aggregated information may include any type of summary, abstract, digest, outline, overview, note, review, excerpt, or other types of information based on the first set of records with respect to any desired aspects of the records. The second report of aggregated information may include any type of summary, abstract, digest, outline, overview, note, review, excerpt, or other types of information based on the second set of records with respect to any desired aspects of the records. FIGS. 13-14 show example reports of aggregated information, consistent with some embodiments of the present disclosure. With reference to FIG. 13, the report 1300 of aggregated information may be generated based on a set of records accessible by the administrator 554. The administrator 554 may be permitted to access the report 1300. With reference to FIG. 14, the report 1400 of aggregated information may be generated based on a set of records accessible by the engineer 550. The engineer 550 may be permitted to access the report 1400. The report 1300 may be different from the report 1400.

In some examples, the system (e.g., including one or more of the data sources 114A, 114B, 114C, the data management device 112, the user devices 118A, 118B, and/or the organization device 116) may provide particularized data security using multiple layers of determinations. For example, the system may apply object-level data security rules to determine which users are permitted to access the record type associated with the organization. The system may (e.g., in addition to, after, or as an alternative to applying the object-level data security rules) apply record-level data security rules to determine which users are permitted to access which particular records of the record type. If a user is permitted to access a particular record of the record type, the system may determine, for example, using visibility configurations, what information within the particular record the user may be permitted to access, and/or what actions the user may be permitted to take regarding the particular record.

Disclosed embodiments may include a non-transitory computer-readable medium including instructions that, when executed by at least one processor, cause the at least one processor to perform operations for particularized data security in a data storage environment. The operations may include identifying one or more data security rules for a type of record. The one or more data security rules may relate to one or more data sources. A record of the type may include a plurality of data items. Disclosed embodiments may include receiving a request by a first user to access a particular record of the type of record; determining, based on the one or more data security rules and the request by the first user, that the first user is permitted to access the particular record; and identifying visibility configurations for the type of record. The visibility configurations may indicate different sets of one or more data items, selected from the plurality of data items, for different types of users. Disclosed embodiments may include determining, based on the visibility configurations and a user type of the first user, a first set of one or more data items of the plurality of data items; and based on the request by the first user, causing a display, via a first user interface, of the first set of one or more data items. In some embodiments, the operations may further include receiving a request by a second user to access the particular record. The operations may further include determining, based on the one or more data security rules and the request by the second user, that the second user is permitted to access the particular record. The operations may further include determining, based on the visibility configurations and a user type of the second user, a second set of one or more data items of the plurality of data items. The second set may be different from the first set. The operations may further include, based on the request by the second user, causing a display, via a second user interface, of the second set of one or more data items. In some embodiments, the plurality of data items may include an information item or an actionable item. In some embodiments, the actionable item may be configured to trigger one or more processes executable by the at least one hardware processor.

Disclosed embodiments may include a method for particularized data security in a data storage environment. The method may include identifying, by a computing device, one or more data security rules for a type of record. The one or more data security rules may relate to one or more data sources. A record of the type may include a plurality of data items. The method may include receiving a request by a first user to access a particular record of the type of record; determining, based on the one or more data security rules and the request by the first user, that the first user is permitted to access the particular record; and identifying visibility configurations for the type of record. The visibility configurations may indicate different sets of one or more data items, selected from the plurality of data items, for different types of users. The method may include determining, based on the visibility configurations and a user type of the first user, a first set of one or more data items of the plurality of data items; and based on the request by the first user, causing a display, via a first user interface, of the first set of one or more data items. The method may further include receiving a request by a second user to access the particular record. The method may further include determining, based on the one or more data security rules and the request by the second user, that the second user is permitted to access the particular record. The method may further include determining, based on the visibility configurations and a user type of the second user, a second set of one or more data items of the plurality of data items. The second set may be different from the first set. The method may further include, based on the request by the second user, causing a display, via a second user interface, of the second set of one or more data items. In some embodiments, the plurality of data items may include an information item or an actionable item. In some embodiments, the actionable item may be configured to trigger one or more processes executable by the at least one hardware processor.

The disclosed embodiments are not limited to the above-described examples, but instead are defined by the appended claims in light of their full scope of equivalents. Moreover, while illustrative embodiments have been described herein, the scope includes any and all embodiments having equivalent elements, modifications, omissions, combinations (e.g., of aspects across various embodiments), adaptations, or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any desired manner, including by reordering steps or inserting or deleting steps.

It is intended, therefore, that the specification and examples be considered as example only, with a true scope and spirit being indicated by the following claims and their full scope of equivalents.

The invention claimed is:

1. A system for particularized data security in a data storage environment, the system comprising:
   at least one non-transitory storage medium configured to store program code; and
   at least one hardware processor configured to execute the program code to perform operations comprising:
   identifying one or more data security rules for a type of record, wherein the one or more data security rules relate to one or more data sources, and wherein a record of the type includes a plurality of data items;
   receiving a request by a first user to access a particular record of the type of record;
   determining, based on the one or more data security rules and the request by the first user, that the first user is permitted to access the particular record;
   identifying visibility configurations for the type of record, wherein the visibility configurations indicate different sets of one or more data items, selected from the plurality of data items, for different types of users;
   determining, based on the visibility configurations and a user type of the first user, a first set of one or more data items of the plurality of data items;
   based on the request by the first user, causing a display, via a first user interface, of the first set of one or more data items;
   receiving, from a second user, an indication to share security permissions associated with the second user for the particular record with the first user; and based on the indication, causing a display, via the first user interface, of a second set of one or more data items of the plurality of data items, wherein the second set is different from the first set.

2. The system of claim 1, wherein the operations further comprise:
   receiving a request by the second user to access the particular record;
   determining, based on the one or more data security rules and the request by the second user, that the second user is permitted to access the particular record;
   determining, based on the visibility configurations and a user type of the second user, the second set of one or more data items of the plurality of data items; and
   based on the request by the second user, causing a display, via a second user interface, of the second set of one or more data items.

3. The system of claim 1, wherein the plurality of data items include an information item or an actionable item.

4. The system of claim 3, wherein the actionable item is configured to trigger one or more processes executable by the at least one hardware processor.

5. The system of claim 1, wherein the plurality of data items include a plurality of tabs in a user interface.

6. The system of claim 1, wherein the first user interface includes a web browser.

7. The system of claim 1, wherein the operations further comprise:
   identifying, in the visibility configurations, one or more rules for the user type of the first user, wherein the one or more rules indicate a default set of data items, of the plurality of data items, to be displayed for the user type of the first user.

8. The system of claim 7, wherein the operations further comprise:
   updating the one or more rules for the user type of the first user by changing the default set of data items to be displayed for the user type of the first user.

9. The system of claim 1, wherein the operations further comprise:
   generating a plurality of records based on input data; and
   permitting or denying access to the plurality of records, based on the one or more data security rules.

10. The system of claim 9, wherein the operations further comprise:
   identifying, based on the one or more data security rules, a first set of records of the plurality of records, wherein the first user is permitted to access the first set of records; and
   identifying, based on the one or more data security rules, a second set of records of the plurality of records, wherein the second user is permitted to access the second set of records, and wherein the second set of records is different from the first set of records.

11. The system of claim 10, wherein the operations further comprise:
   generating, based on the first set of records, a first report of aggregated information, wherein the first user is permitted to access the first report; and
   generating, based on the second set of records, a second report of aggregated information, wherein the second user is permitted to access the second report, and wherein the second report is different from the first report.

12. A non-transitory computer-readable medium including instructions that, when executed by at least one processor, cause the at least one processor to perform operations for particularized data security in a data storage environment, the operations comprising:

identifying one or more data security rules for a type of record, wherein the one or more data security rules relate to one or more data sources, and wherein a record of the type includes a plurality of data items;

receiving a request by a first user to access a particular record of the type of record;

determining, based on the one or more data security rules and the request by the first user, that the first user is permitted to access the particular record;

identifying visibility configurations for the type of record, wherein the visibility configurations indicate different sets of one or more data items, selected from the plurality of data items, for different types of users;

determining, based on the visibility configurations and a user type of the first user, a first set of one or more data items of the plurality of data items;

based on the request by the first user, causing a display, via a first user interface, of the first set of one or more data items;

receiving, from a second user, an indication to share security permissions associated with the second user for the particular record with the first user; and based on the indication, causing a display, via the first user interface, of a second set of one or more data items of the plurality of data items, wherein the second set is different from the first set.

13. The non-transitory computer-readable medium of claim 12, wherein the operations further comprise:

receiving a request by the second user to access the particular record;

determining, based on the one or more data security rules and the request by the second user, that the second user is permitted to access the particular record;

determining, based on the visibility configurations and a user type of the second user, the second set of one or more data items of the plurality of data items; and based on the request by the second user, causing a display, via a second user interface, of the second set of one or more data items.

14. The non-transitory computer-readable medium of claim 12, wherein the plurality of data items include an information item or an actionable item.

15. The non-transitory computer-readable medium of claim 14, wherein the actionable item is configured to trigger one or more processes executable by the at least one hardware processor.

16. A method for particularized data security in a data storage environment, the method comprising:

identifying, by a computing device, one or more data security rules for a type of record, wherein the one or more data security rules relate to one or more data sources, and wherein a record of the type includes a plurality of data items;

receiving a request by a first user to access a particular record of the type of record;

determining, based on the one or more data security rules and the request by the first user, that the first user is permitted to access the particular record;

identifying visibility configurations for the type of record, wherein the visibility configurations indicate different sets of one or more data items, selected from the plurality of data items, for different types of users;

determining, based on the visibility configurations and a user type of the first user, a first set of one or more data items of the plurality of data items;

based on the request by the first user, causing a display, via a first user interface, of the first set of one or more data items;

receiving, from a second user, an indication to share security permissions associated with the second user for the particular record with the first user; and based on the indication, causing a display, via the first user interface, of a second set of one or more data items of the plurality of data items, wherein the second set is different from the first set.

17. The method of claim 16, further comprising:

receiving a request by the second user to access the particular record;

determining, based on the one or more data security rules and the request by the second user, that the second user is permitted to access the particular record;

determining, based on the visibility configurations and a user type of the second user, the second set of one or more data items of the plurality of data items; and based on the request by the second user, causing a display, via a second user interface, of the second set of one or more data items.

18. The method of claim 16, wherein the plurality of data items include an information item or an actionable item.

19. The method of claim 18, wherein the actionable item is configured to trigger one or more processes executable by the at least one hardware processor.

* * * * *